US011194450B2

(12) United States Patent
Kuo et al.

(10) Patent No.: US 11,194,450 B2
(45) Date of Patent: Dec. 7, 2021

(54) DEFINITION OF A GRAPHICAL USER INTERFACE DASHBOARD CREATED WITH MANUALLY INPUT CODE AND USER SELECTIONS

(71) Applicant: salesforce.com, inc., San Francisco, CA (US)

(72) Inventors: Charles Weichih Kuo, Saratoga, CA (US); Tony Wong, San Francisco, CA (US); Wayne Rantala, Aurora (CA); Amey Ruikar, Mountain View, CA (US); Shailesh Dinkar Govande, Sunnyvale, CA (US); Aishwarya Kumar, Fremont, CA (US); Raksha Subramanyam, Fremont, CA (US); Kevin Wang, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/658,051

(22) Filed: Oct. 19, 2019

(65) Prior Publication Data

US 2021/0117056 A1    Apr. 22, 2021

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 3/0482* (2013.01); *G06F 9/451* (2018.02)

(58) Field of Classification Search
CPC .......... G06F 3/00; G06F 3/048; G06F 3/0481; G06F 3/0482; G06F 3/0484; G06F 9/451
See application file for complete search history.

(56) References Cited

U.S. PATENT DOCUMENTS 8,291,334 B1 * 10/2012 Castellanos ............. G06F 3/048
715/769
10,447,546 B1 * 10/2019 Guo ...................... G06F 11/301
(Continued)

FOREIGN PATENT DOCUMENTS

WO    WO-0101206 A2 *  1/2001  ............. G05B 17/02

OTHER PUBLICATIONS

Echarts, "Add interaction to the chart component", Available Online at <https://echarts.apache.org/en/tutorial.html#Add%20interaction%20to%20the%20chart%20component>, Retrieved on Apr. 8, 2020, 7 pages.
(Continued)

*Primary Examiner* — Xiomara L Bautista
(74) *Attorney, Agent, or Firm* — Nicholson, De Vos, Webster & Elliott, LLP

(57) ABSTRACT

Methods and systems are described for creating and/or processing a definition for a dashboard with manually input code and user selections in a graphical user interface. In some implementations, user interface elements are displayed and selections from a user accepted. Responsive to the selections, definitions for one or more visualizations and datasources are automatically generated and displayed in a user interface element that accepts manually input customizations and code from the user. The resulting combination of code and definitions is stored as a definition for the dashboard, which when processed will transform data received from the at least one of the datasources, combine the transformed data with data from another of the datasources, and cause the display of a visualization based on the combined data.

23 Claims, 15 Drawing Sheets

(51) Int. Cl.
    G06F 3/0482      (2013.01)
    G06F 9/451       (2018.01)

(56) References Cited

U.S. PATENT DOCUMENTS

| | | | |
|---|---|---|---|
| 10,454,803 B2 | 10/2019 | Gal et al. | |
| 10,511,564 B2 | 12/2019 | Govande | |
| 10,897,405 B2 | 1/2021 | Subramanyam | |
| 10,924,334 B1 | 2/2021 | Kumar et al. | |
| 2009/0228572 A1* | 9/2009 | Wall | G06F 16/4393 709/218 |
| 2011/0210986 A1* | 9/2011 | Goutsev | G06F 8/38 345/672 |
| 2012/0041990 A1* | 2/2012 | Kreindlina | G06F 16/248 707/805 |
| 2014/0108985 A1* | 4/2014 | Scott | G05B 19/4188 715/771 |
| 2017/0308571 A1* | 10/2017 | McCurley | G06F 16/243 |
| 2018/0024701 A1* | 1/2018 | Sanches | G06F 40/166 715/781 |
| 2019/0052518 A1 | 2/2019 | Gal et al. | |
| 2019/0138626 A1 | 5/2019 | Nguyen et al. | |
| 2019/0236159 A1 | 8/2019 | Subramanyam et al. | |
| 2019/0277651 A1 | 9/2019 | Ruikar | |
| 2019/0369969 A1* | 12/2019 | Donohoe | G06F 9/455 |
| 2020/0052995 A1 | 2/2020 | Gal et al. | |
| 2020/0242091 A1 | 7/2020 | Ruikar | |
| 2020/0242240 A1 | 7/2020 | Ruikar et al. | |
| 2020/0401580 A1* | 12/2020 | Fitzpatrick | G06F 16/248 |
| 2021/0081427 A1 | 3/2021 | Obembe et al. | |
| 2021/0089649 A1 | 3/2021 | Subramanyam et al. | |
| 2021/0103561 A1 | 4/2021 | Obembe et al. | |
| 2021/0103567 A1 | 4/2021 | Zaslavsky et al. | |
| 2021/0103568 A1 | 4/2021 | Zaslavsky et al. | |

OTHER PUBLICATIONS

Echarts, "An Example: Implement Dragging", Available Online at <https://echarts.apache.org/en/tutorial.html#An%20Example%3A%20Implement%20Dragging>, Retrieved on Apr. 8, 2020, 9 pages.
Echarts, "Create Custom Build of ECharts", Available Online at <https://echarts.apache.org/en/tutorial.html#Create%20Custom%20Build%20of%20ECharts>, Retrieved on Apr. 8, 2020, 10 pages.
Echarts, "Custom Series", Available Online at <https://echarts.apache.org/en/tutorial.html#Custom%20Series>, Retrieved on Apr. 8, 2020, 11 pages.
Echarts, "Customized Chart Styles", Available Online at <https://echarts.apache.org/en/tutorial.html#Customized%20Chart%20Styles>, Retrieved on Apr. 8, 2020, 7 pages.
Echarts, "Dataset", Available Online at <https://echarts.apache.org/en/tutorial.html#Dataset>, Retrieved on Apr. 8, 2020, 20 pages.
Echarts, "ECharts Basic Concepts Overview", Available Online at <https://echarts.apache.org/en/tutorial.html#ECharts%20Basic%20Concepts%20Overview>, Retrieved on Apr. 8, 2020, 10 pages.
Echarts, "Events and Actions in ECharts", Available Online at <https://echarts.apache.org/en/tutorial.html#Events%20and%20Actions%20in%20ECharts>, Retrieved on Apr. 8, 2020, 8 pages.
Echarts, "Get Started with ECharts in 5 minutes", Available Online at <https://echarts.apache.org/en/tutorial.html#Get%20Started%20with%20ECharts%20in%205%20minutes>, Retrieved on Apr. 8, 2020, 4 pages.
Echarts, "Loading and Updating of Asynchronous Data", Available Online at <https://echarts.apache.org/en/tutorial.html#Loading%20and%20Updating%20of%20Asynchronous%20Data>, Retrieved on Apr. 8, 2020, 4 pages.
Echarts, "Overview of Style Customization", Available Online at <https://echarts.apache.org/en/tutorial.html#Overview%20of%20Style%20Customization>, Retrieved on Apr. 8, 2020, 5 pages.
Echarts, "Render by Canvas or SVG", Available Online at <https://echarts.apache.org/en/tutorial.html#Render%20by%20Canvas%20or%20SVG>, Retrieved on Apr. 8, 2020, 4 pages.
Echarts, "Responsive Mobile-End", Available Online at <https://echarts.apache.org/en/tutorial.html#Responsive%20Mobile-End>, Retrieved on Apr. 8, 2020, 9 pages.
Echarts, "Rich Text", Available Online at <https://echarts.apache.org/en/tutorial.html#Rich%20Text>, Retrieved on Apr. 8, 2020, 12 pages.
Echarts, "Server-side Rendering", Available Online at <https://echarts.apache.org/en/tutorial.html#Server-side%20Rendering>, Retrieved on Apr. 8, 2020, 1 page.
Echarts, "Supporting ARIA in Charts", Available Online at <https://echarts.apache.org/en/tutorial.html#Supporting%20ARIA%20in%20Charts>, Retrieved on Apr. 8, 2020, 2 pages.
Echarts, "Use ECharts with webpack", Available Online at <https://echarts.apache.org/en/tutorial.html#Use%20ECharts%20with%20webpack>, Retrieved on Apr. 8, 2020, 3 pages.
Echarts, "Visual Map of Data", Available Online at <https://echarts.apache.org/en/tutorial.html#Visual%20Map%20of%20Data>, Retrieved on Apr. 8, 2020, 6 pages.
Grafana Labs, "Add a data source", Available Online at <https://grafana.com/docs/grafana/latest/features/datasources/add-a-data-source/>, Retrieved on Apr. 8, 2020, 4 pages.
Grafana Labs, "Alerting Engine and Rules Guide", Available Online at <https://grafana.com/docs/grafana/latest/alerting/rules/>, Retrieved on Apr. 8, 2020, 8 pages.
Grafana Labs, "Dashboard JSON", Available Online at <https://grafana.com/docs/grafana/latest/reference/dashboard/>, Retrieved on Sep. 25, 2019, 8 pages.
Grafana Labs, "Dashboard overview", Available Online at <https://grafana.com/docs/grafana/latest/features/dashboard/dashboards/>, Retrieved on Apr. 8, 2020, 5 pages.
Grafana Labs, "Developing Datasource Plugins", Available Online at <https://grafana.com/docs/grafana/latest/plugins/developing/datasources/>, Retrieved on Sep. 25, 2019, 5 pages.
Grafana Labs, "Explore", Available Online at <https://grafana.com/docs/grafana/latest/features/explore/>, Retrieved on Apr. 8, 2020, 13 pages.
Grafana Labs, "Getting started", Available Online at <https://grafana.com/docs/grafana/latest/guides/getting_started/#getting-started>, Retrieved on Apr. 8, 2020, 4 pages.
Grafana Labs, "Glossary", Available Online at <https://grafana.com/docs/grafana/latest/guides/glossary/>, Retrieved on Apr. 8, 2020, 4 pages.
Grafana Labs, "Grafana documentation", Available Online at <https://grafana.com/docs/grafana/latest/>, Retrieved on Apr. 8, 2020, 6 pages.
Grafana Labs, "Image rendering", Available Online at <https://grafana.com/docs/grafana/latest/administration/image_rendering/>, Retrieved on Apr. 8, 2020, 8 pages.
Grafana Labs, "Keyboard shortcuts", Available Online at <https://grafana.com/docs/grafana/latest/features/shortcuts/>, Retrieved on Apr. 8, 2020, 4 pages.
Grafana Labs, "Navigation links", Available Online at <https://grafana.com/docs/grafana/latest/features/navigation-links/>, Retrieved on Apr. 8, 2020, 8 pages.
Grafana Labs, "Panel overview", Available Online at <https://grafana.com/docs/grafana/latest/features/panels/panels/>, Retrieved on Apr. 8, 2020, 5 pages.
Grafana Labs, "Reporting", Available Online at <https://grafana.com/docs/grafana/latest/features/reporting/>, Retrieved on Apr. 8, 2020, 4 pages.
Grafana Labs, "The open observability platform", Available Online at <https://grafana.com/>, Retrieved on Apr. 8, 2020, 6 pages.
Grafana Labs, "What is Grafana?", Available Online at <https://grafana.com/docs/grafana/latest/guides/what-is-grafana/>, Retrieved on Apr. 8, 2020, 6 pages.
Marc, "Pimp the dataflows connector in Power BI", Data—Marc, Available Online at <https://data-marc.com/2019/04/16/pimp-the-dataflows-connector-in-power-bi/>, Apr. 16, 2019, 7 pages.
Microsoft Docs, "Introduction to dataflows and self-service data prep," Oct. 1, 2020, downloaded from https://docs.microsoft.com/

(56) References Cited

OTHER PUBLICATIONS en-us/power-bi/transform-model/dataflows/dataflows-introduction-self-service, 3 pages.

\* cited by examiner

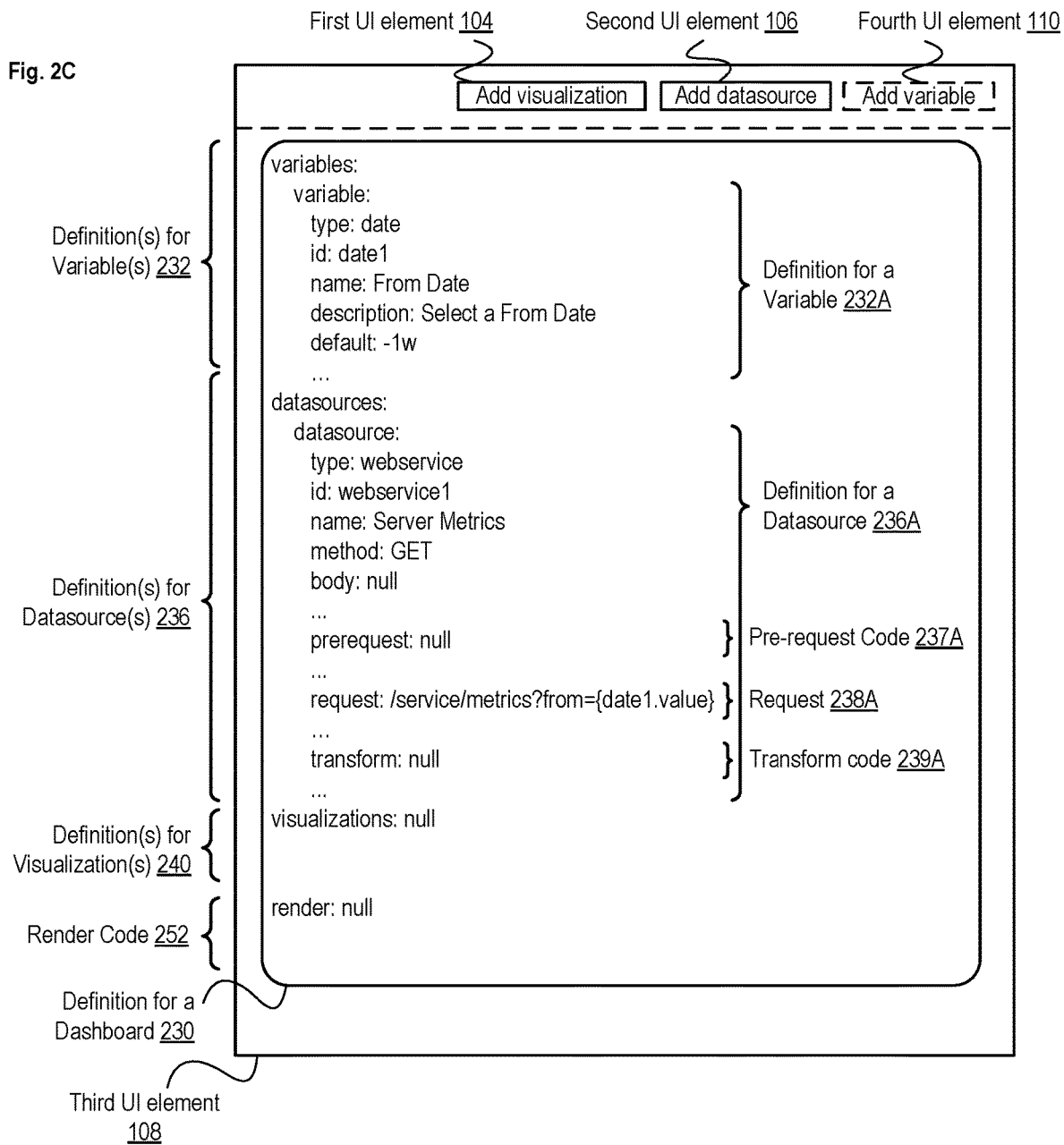

DEFINITION OF A GRAPHICAL USER INTERFACE DASHBOARD CREATED WITH MANUALLY INPUT CODE AND USER SELECTIONS

TECHNICAL FIELD

One or more implementations relate to the field of graphical user interface dashboards, and more specifically, to definitions for such dashboards.

BACKGROUND ART

A dashboard is a user interface (UI) for visualizing data, typically presented on a single screen of a device in either a web browser or a native application. Many businesses use dashboards to display data for viewing by multiple users.

Some tools allow a dashboard to be created by a user manually inputting all of the code required for the dashboard. Other tools allow a dashboard to be created by a user solely making selections in a UI for creating dashboards.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 2C is a diagram showing an exemplary definition for a dashboard that includes a definition for a datasource, according to some example implementations.

DETAILED DESCRIPTION

The following description describes implementations for creating a definition for a dashboard, and implementations for processing a definition for a dashboard to display the dashboard. For example, some exemplary implementations include 1) displaying UI elements, 2) accepting selections from a user through those UI elements of one or more types of visualizations, one or more datasources, and/or optionally one or more types of variables, 3) automatically generating, and displaying, definitions for the selections, 4) accepting manually input customizations and/or code, and 5) storing a resulting combination of code and definitions as a definition for a dashboard. Additionally or alternatively, some exemplary implementations include processing a definition for a dashboard, including: 1) processing one or more definitions for datasources included in the definition for the dashboard, 2) processing one or more definitions for visualizations included in the definition for the dashboard, and 3) displaying the dashboard (including displaying the dashboard and the visualization(s)).

Compared to using a tool that allows a user to create a dashboard by manually inputting all of the code required for the dashboard, implementations described herein allow a user to create a dashboard in a less labor-intensive manner, and without the same level of expertise in writing code for a dashboard. Also, compared to using a tool that allows a user to create a dashboard solely by making selections in a UI for creating dashboards, implementations described herein results in a dashboard whose functionality is not limited by the user's ability to make selections in the UI; e.g., the dashboard is not limited by the extent to which data to display in the dashboard can be manipulated.

Figure 1A:
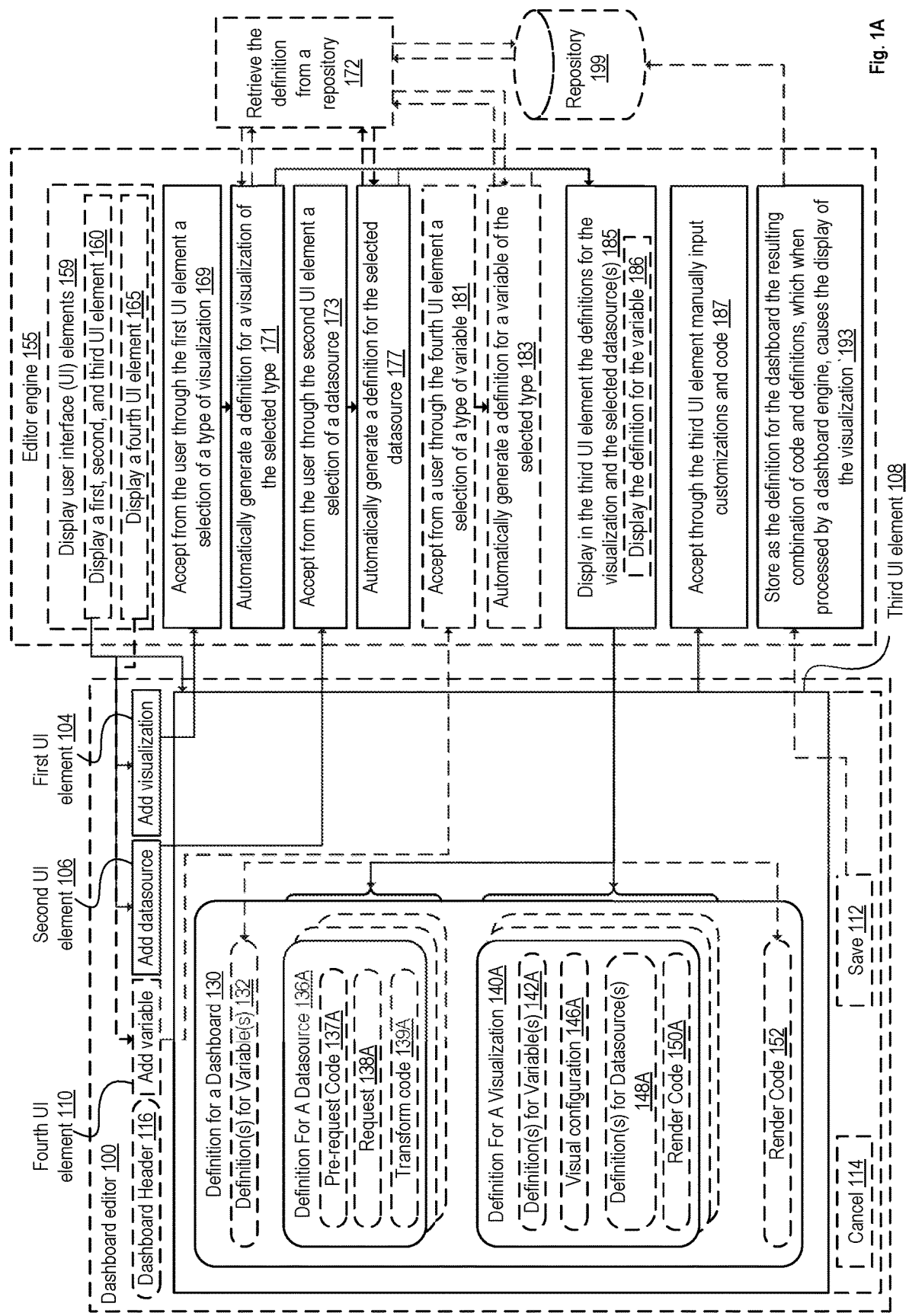
FIG. 1A is a block diagram showing a dashboard editor and engine for creating and/or editing a definition for a dashboard according to some example implementations.

FIG. 1A is a block diagram showing a dashboard editor 100 and editor engine 155 for creating and/or editing a definition for a dashboard according to some example implementations. The dashboard editor 100 includes UI elements: a first UI element 104 (shown with the text "Add visualization"); a second UI element 106 (shown with the text "Add datasource"); a third UI element 108 for displaying a definition for a dashboard 130; an optional fourth UI element 110 (shown with the text "Add variable"); and the optional UI elements shown as Save 112 and Cancel 114 respectively for saving a definition for a dashboard and discarding changes that the user has made to a definition for a dashboard.

The optional editor engine 155 may, in block 157 (shown in FIG. 1B), perform operations associated with a graphical user interface (GUI) that enables a user to create a definition for a dashboard 157. Those operations may include those described in block 159, including displaying UI elements; e.g., displaying a first, second, third, and fourth UI element. Specifically, execution of block 159 may include execution of optional block 160 and/or optional block 165. In block 160, a first, second, and third UI element is displayed. In block 161, the first UI element (e.g., first UI element 104) is displayed. In block 163, the second UI element (e.g., second UI element 106) is displayed. In block 167, a third UI element (e.g., third UI element 108) is displayed. In block 165, a fourth UI element (e.g., fourth UI element 110) is displayed.

A UI element means an element of which a user interface is comprised, such as an input element (e.g., dropdown list, toggle), navigation element (e.g., search field, icon), informational element (e.g., text label, visualization), container element (e.g., accordion), etc. In some implementations, a UI element which allows a user to perform an action (e.g., optional actions 102 shown in FIG. 1C referring to the first, second, and fourth UI elements) is an input element. For example, the first UI element 104 may be a dropdown list which allows a user to select a type of visualization from multiple types of visualizations. In other implementations, a UI element which allows a user to perform an action, such as the first UI element 104, may be a different type of UI element that allows for user selections. For example, the first UI element 104 may be a button that, on user selection, automatically generates a definition for a visualization. This definition for a variable may be a generic definition, a frequently-used definition, a definition which is configured in a configuration for the user and/or for the dashboard editor 100, etc. As another example, the first UI element 104 may be a button that, on user selection, displays a window that allows a user to select one or more types of visualization. One or more of the first, second, third, and/or fourth UI elements may be the same or different types of UI elements in some implementations.

In some implementation, with one or more of first UI element 104, second UI element 106, and optional fourth UI element 110, a user can respectively select more than one type of visualization, datasource, and/or type of variable iteratively; e.g., to select a plurality of datasources, a user can select a datasource, that selection be accepted (e.g., in block 173), and a definition for the selected datasource automatically generated (e.g., in block 177), then the user can select another datasource, that selection be accepted (e.g., in block 173), and a definition for that datasource automatically generated (e.g., in block 177), etc. Automatically generated means without further user input. A user can select a plurality of types of visualizations or types of variables in a like fashion. Additionally or alternatively in some implementations, a user may select a plurality of types of visualizations, datasources, and/or types of variables through the respective first, second, and fourth UI element. For example, the first UI element may allow the user to select one or more types of visualizations via a dropdown list with checkboxes by each element, wherein selecting a checkbox for a type of visualization includes that type in the plurality of types of visualizations.

In some implementations, a user can select from multiple types of visualizations, multiple datasources, and/or types of variables with one or more of first UI element 104, second UI element 106, and optional fourth UI element 110. For example, first UI element 104 may allow a user to select from multiple types of visualizations such as a table, a chart, a graph, etc.; second UI element 106 may allow a user to select from multiple datasources such as a database, a file, a webservice, etc.; and/or fourth UI element 110 may allow a user to select from multiple types of variables such as a date type, a text type, a numerical type, etc.

When a UI element such as first UI element 104, second UI element 106, or third UI element 108 is displayed, a user can perform operations with that UI element. For example, when first UI element 104 is displayed, block 169 is executed responsive to user input associated with the first UI element 104. Specifically, block 169 includes accepting from a user through the first UI element (e.g., first UI element 104) a selection of a type of visualization (i.e., as a selected type of visualization). A visualization is a graphical depiction of data. For example, a dashboard may include a visualization which shows the patch status of servers in a server farm (cf. FIG. 4C). A type of visualization may be a chart, a graph, a map, a specific type of the foregoing (e.g., a line chart, a bar chart), etc.

From block 169, flow passes to block 171. In block 171, a definition for a visualization of the selected type is automatically generated. As shown by the dashed lines between block 171 and block 172 in FIG. 1A, automatically generating a definition for a visualization of the currently selected type may optionally include execution of block 172 in which the definition for a visualization from a repository 199 is retrieved.

Figure 1B:
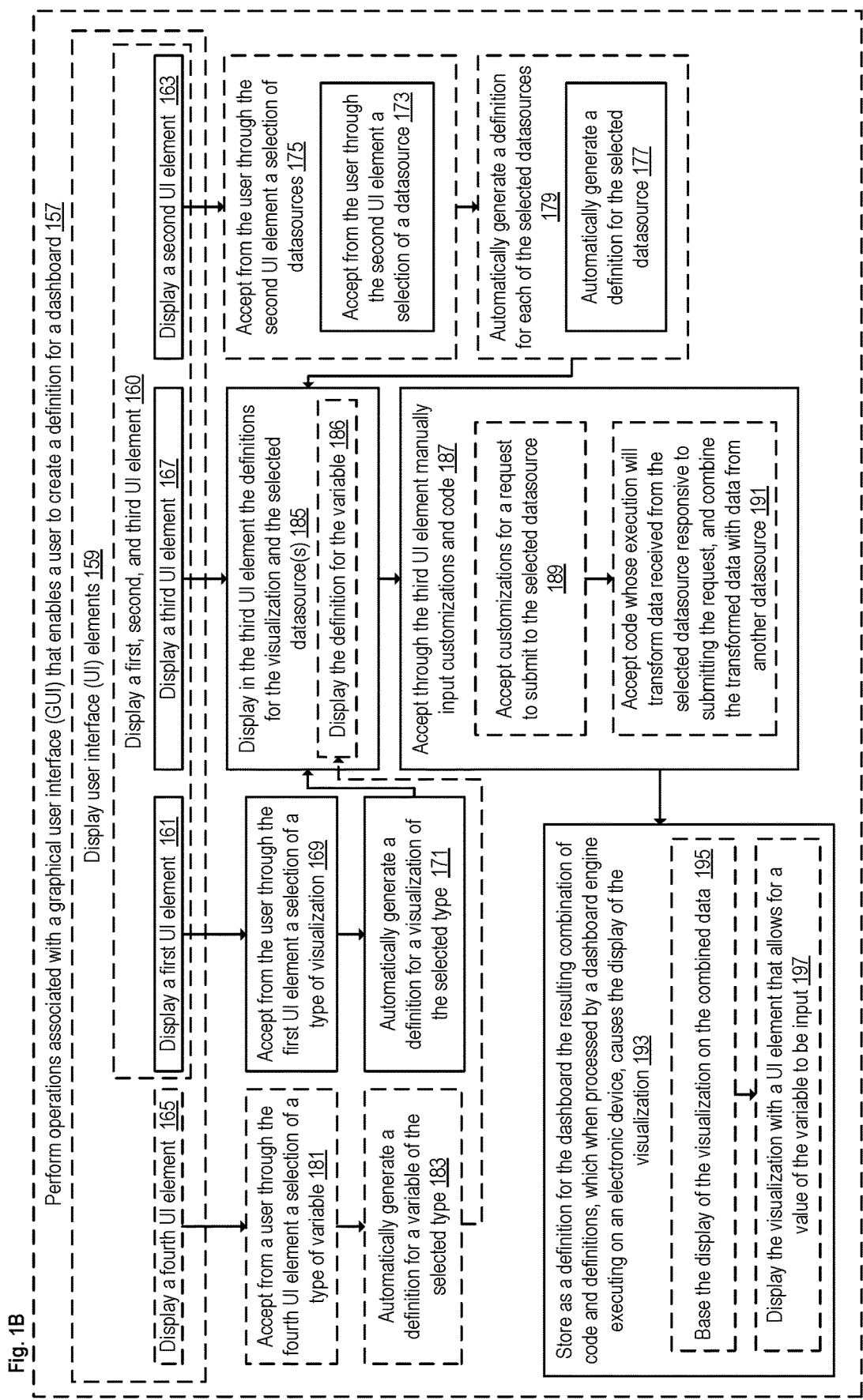
FIG. 1B is a flow diagram showing operations that enable a user to create a definition for a dashboard according to some example implementations.

When the second UI element 106 is displayed, block 173 is executed responsive to user input associated with the second UI element 106. Specifically, block 173 includes accepting from a user through the second UI element (e.g., second UI element 106) a selection of a datasource (i.e., as a selected datasource). A datasource is a source of data for a dashboard; e.g., a database, a file, a webservice, a representational state transfer (REST) application programming interface (API) endpoint, etc. A datasource may contain one or more records (e.g., rows in a table in a relational database, JavaScript Object Notation (JSON) objects, key-value pairs, etc.) and those records may comprise a set of fields (e.g., columns of the table, attributes, etc.). With reference to FIG. 1B, in some implementations, optional block 175 is executed responsive to user input associated with the second UI element 106. In block 175 (which includes block 173), a selection of datasources (i.e., as selected datasources) is accepted from the user through the second UI element. The datasources may be selected iteratively or otherwise as previously described.

A datasource can be distinguished from other datasources in different ways. For example, a webservice may differ from a database based on the Uniform Resource Locator (URL) at which the webservice can be located compared to the URL at which the database can be located (a URL is an address of a resource located on a network). Datasources may have other differences; e.g., a definition for a particular webservice may include a protocol (e.g., HyperText Transfer Protocol (HTTP)), an HTTP method (e.g., GET, PUT, POST, DELETE), a URL, etc., while a definition for a particular database may include a name of a database server, a name of a database instance, a path to a configuration file, etc. However, a database may differ from another database (e.g., in the name of the database instance); a webservice may differ from another webservice (e.g., in the URL at which the webservices can be located); etc. Thus, depending on the implementation, a definition for a datasource may correspond to a definition for a type of datasource (e.g., a database, a file, a webservice, a REST API endpoint, etc.) or an instance thereof (e.g., a particular database, a particular file, a particular webservice, etc.).

From block 173 or optional block 175, flow passes to either block 177 or optional block 179. In block 177 a definition for the selected datasource is automatically generated, while in block 179 a definition for each of the selected datasources is generated. As shown by the dashed lines between block 177 and block 172 in FIG. 1A, automatically generating a definition for one or more selected datasources may optionally include retrieving a definition for the selected datasource(s) from a repository 199.

From optional block 181, flow passes to optional block 183. In block 183, a definition for a variable of the selected type is automatically generated. As shown by the dashed lines between block 173 and block 172 in FIG. 1A, automatically generating a definition for a variable of the currently selected type may optionally include retrieving a definition for a variable from a repository 199.

When the optional fourth UI element 110 is displayed, block 181 is executed responsive to user input associated with the fourth UI element 110. Specifically, block 181 includes accepting from a user through the fourth UI element (e.g., fourth UI element 110) a selection of a type of variable (i.e., as a selected type of variable).

"Variable" means a reference to a value which can be changed. In the context of a dashboard, a value of a variable can be input (e.g., by a user) and used (e.g., in a request to be submitted to a datasource). "Type of variable" may refer to a type of data that the variable stores; e.g., a date, a date range, a time, text, a numerical value, etc. As described further herein, in some implementations, displaying a dashboard may include displaying a UI element that allows for a value of a variable to be input. In some implementations, that value can be used in different ways (e.g., a request to be submitted to a datasource may be based on that value, data stored in or available from a datasource may be updated with that value, a visual configuration of a visualization may be changed with that value, etc.).

From block 181, flow passes to block 183. In block 183, a definition for a variable of the selected type is automatically generated. As shown in FIG. 1A, automatically generating a definition for a variable of the currently selected type may optionally include execution of block 172, in which the definition for a variable from a repository 199 is retrieved.

From block 171, block 177 or block 179, and optional block 183, flow passes to block 185. In block 185, the definitions for the visualization and the selected datasource(s) are displayed in the third UI element (e.g., third UI element 108) which is displayed in block 167. In optional block 186, the definition for the variable (e.g., automatically generated in block 183) is displayed in the third UI element. In some implementations (not shown in FIGS. 1A and 1B), flow may pass iteratively; i.e., flow may pass to block 185 from one or more of block 171, block 177 or block 179, and optional block 183 to display one or more automatically generated definitions, then flow may pass to block 185 from one or more of those blocks to display one or more other automatically generated definitions, etc. Put differently, the definition for the visualization generated in block 171 may be displayed in the third UI element before or after the definition(s) for the datasource(s) generated in blocks 177 and/or 179 are displayed in the third UI element and/or before or after the definition for a variable generated in block 183 is displayed in the third UI element, for example.

Moreover, one of skill in the art will recognize that one or more of the pairs of block 169 and block 171, block 173/block 175 and block 177/179, and block 181 and block 183 can be executed one or more times and the corresponding definition(s) for visualization(s), definition(s) for datasource(s), and/or definition(s) for variable(s) displayed in the third UI element iteratively or otherwise (e.g., at the same time). For example, in one execution of block 173 and block 177, a selection of a datasource is accepted from the user through the second UI element in block 173 and a definition for the selected datasource is automatically generated in block 177. In another execution of block 173 and block 177, a selection of another datasource is accepted and a definition for that datasource automatically generated. In some implementations, the definition generated in one execution may be displayed in the third UI element before the second execution, and the definition generated in the second execution displayed thereafter. In other implementations, both definitions may be displayed in the third UI element after the second execution (e.g., a wizard may guide a user to select one or more datasources, cause definitions for those one or more datasources to be generated, then display the definitions).

From block 185, flow passes to block 187. In block 187, manually input customizations and code are accepted through the third UI element. Manually input means input by a user and "customizations" means manually input changes (e.g., to a definition that was automatically generated). In some implementations, manually input customizations or code are written manually by the user. In other implementations, manually input customizations or code may have been written manually by another user and/or generated. Since various definitions can be displayed in the third UI element in block 185 and optionally in block 186, the customizations and code may be input in the context of one or more definitions being displayed by the third UI element (e.g., third UI element 108).

Inputting customizations and code in this context facilitates inputting customizations and code; in some implementations, a user can input customizations and/or code directly via the third UI element. For example, in some implementations, the third UI element may be a UI element that allows a user to view and edit text (i.e., a text editor element). In some implementations, the third UI element may allow a user to view and edit code, and/or view and input customizations to the one or more definitions displayed by the third UI element. The third UI element may provide text editing capabilities; additionally or alternatively it may provide specific capabilities relating to code and/or definitions. For example, the third UI element may provide one or more of syntax highlighting, code and/or definition completion, search features, support for different programming languages, etc. Additionally or alternatively, the third UI element may provide visual programming features. For example, one or more definitions may be represented by one or more geometric figures, which may be arranged to reflect the structure of the definition for the dashboard (e.g., the sections and/or levels described later herein). In some implementations, the third UI element may provide one or more of integration with version control for code and/or definitions (e.g., through optional repository 199), automated refactoring, debugging, dashboard preview features, etc. In other implementations, the third UI element may allow a user to manually input customizations and/or code through selecting one or more files or file fragments which contain those customizations and/or code. The third UI element may be scrollable such that, for a definition for a dashboard spanning more than the viewing area of the UI element, a user can view portions of the definition not displayed in the viewing area at a given time by scrolling through the portion displayed.

In some implementations, block 187 includes one or more of optional block 189 and block 191. In block 189, customizations for a request to submit to the selected datasource are accepted. In another example, customizations could include customizations for a request to submit to at least one of the selected datasources (e.g., those for which definitions are generated in optional block 179). Many other customizations are possible. In some implementations, automatically generated definitions are displayed as text (in other implementations they may be displayed graphically) and can be edited as text. Thus, customizations may include customizations to any aspect of one or more definitions in the definition for the dashboard.

In block 191, code is accepted whose execution will transform data received from the selected datasource responsive to submitting the request and combine the transformed data with data from another datasource (e.g., one of those for which a selection is accepted in optional block 175 (i.e., another of the selected datasources)). As described further (e.g., in relation to FIGS. 4A and 4B), code input by a user can perform any manner of operations in relation to a visualization, a datasource, a variable, and/or a dashboard. Thus, implementations described herein provide advantages over tools that do not allow a user to input code; e.g., tools that only allow a user to create a dashboard by making selections in a UI for creating dashboards. For example, implementations described herein allow a user greater flexibility and a richer bevy of possible functionality in relation to datasources, visualizations, variables, and the data that they respectively provide and display. Specifically, implementations described herein allow a user to create a dashboard which transforms data from a datasource and/or combines it with data from another datasource. This allows for a dashboard which can handle data in unexpected or different formats for example, and/or display more meaningful visualizations; dashboards created solely by user selections are limited in these capabilities. A definition for a dashboard created using implementations described herein may therefore provide a richer, more flexible, and/or more useful dashboard.

From block 187, flow passes to block 193. In block 193, the resulting combination of code and definitions is stored as a definition for a dashboard. The definition for a dashboard may be stored at different times in one or more different implementations; e.g., the definition for a dashboard may be stored on a user selecting the optional UI element designated as "Save 112." Additionally or alternatively, the definition for a dashboard may be stored incrementally (e.g., manually or automatically at designated time intervals, after one or more definitions are generated, after code is accepted, after customizations are accepted, etc.). In some implementations, the definition for a dashboard is stored in repository 199.

In some implementations, a definition for a dashboard, when processed by a dashboard engine executing on an electronic device, causes display of a visualization. A dashboard engine is software which, when executed on an electronic device, is capable of causing operations for displaying a dashboard based on a definition for the dashboard. As shown in optional block 195, the display of the visualization may be based on the combined data (e.g., data combined through executing the code manually input in optional block 191). As shown in optional block 197, the visualization may be displayed with a UI element that allows for a value of the variable (e.g., the variable for which a definition is automatically generated in block 183) to be input.

Definitions

FIG. 1A also shows a definition for a dashboard 130. A "definition for" a dashboard, visualization, variable, or datasource respectively means information that describes that dashboard, visualization, variable, or datasource. Such a definition may 1) be expressed in various ways; e.g., in a markup language (e.g., extensible markup language (XML), hypertext markup language (HTML)), in a serialization language (e.g., YAML Ain't Markup Language (YAML), JSON), in a programming language (e.g., an object-oriented language), in combinations of such languages, etc.; and 2) comprise code, one or more other definitions, and/or other data. For example, a definition for a dashboard may include definitions for one or more datasources (e.g., definition for a datasource 136A as shown in FIG. 1A, definition(s) for datasource(s) 136 shown in FIG. 1C), variables (e.g., definition(s) for variable(s) 132 shown in FIGS. 1A and 1C), and/or visualizations (e.g., definition for a visualization 140A shown in FIG. 1A, definition(s) for visualization(s) 140 shown in FIG. 1C); in some implementations, these definitions may be expressed in YAML (and may include code). A definition for a dashboard may include code (e.g., pre-request code 137A, transform code 139A, render code 150A, and/or render code 152); in some implementations, the code may be expressed in JavaScript. A definition (or part thereof) may be automatically generated (e.g., responsive to a user selection of a UI element) as described herein.

Definition for a Dashboard

A definition for a dashboard is a definition that describes a dashboard to be displayed in a GUI. A GUI is a UI that allows a user to interact with an electronic device through graphical elements, as opposed to other forms of user interface (e.g., a command-line interface); the terms GUI and UI, and thus GUI element and UI element, are used interchangeably herein. A definition for a dashboard may include a combination of code and data. For example, a definition for a dashboard may include definitions (e.g., of one or more visualizations, one or more datasources, and/or one or more variables) and code (e.g., which includes instructions, the execution of which will combine data from multiple datasources). A definition for a dashboard may contain other data (e.g., optionally, a dashboard header). The code and/or data may be stored in separate parts of a definition for a dashboard. When processed by a dashboard engine executing on an electronic device, a definition for a dashboard causes the display of a dashboard corresponding to the definition in some implementations.

A definition for a dashboard as described herein provides several advantages. Storing a combination of definitions and code as a definition for a dashboard simplifies dashboard creation, management, and processing. For example, storing both definitions and code in a single definition for a dashboard avoids having to create, manage, and process multiple artefacts for a single dashboard. Moreover, a single definition allows a user to view and edit a definition for a dashboard in one place, through a single UI. Creating a definition for a dashboard with user selections may reduce the development effort required, and thus for some users may reduce or eliminate a barrier to creating a definition. Automatically generating one or more definitions saves manually inputting them. Allowing a user to manually input code in the definition for the dashboard allows for richer and more flexible dashboards, resulting in a scenario which can provide benefits of both creating dashboards solely through user selections, and creating dashboards solely through manually input of code.

A definition for a dashboard as described herein may provide benefits relative to those created via other techniques. For example, a definition for a dashboard such as definition for a dashboard 130 has a well-defined structure. The structure includes separate parts; e.g., sections (e.g., a section corresponding to definition(s) for variable(s) 132, a section corresponding to definition(s) for datasource(s) 136, etc.) and/or levels (e.g., one level which includes the aforementioned sections, and another level which includes definition(s) or code included in those sections (which themselves may be sections), etc.). The sections and/or levels can be demarcated. For example, sections and/or levels can be demarcated by tags (see, e.g., the tags "variables," "visualizations," "datasources," "type," "id," "request," "transform," etc. in FIGS. 2A through 2D) and/or indentations (see, e.g., FIGS. 2A through 2D). Sections and/or levels can be demarcated in other ways (e.g., via different syntax (e.g., characters such as curly braces, brackets, commas, etc.), whitespace (e.g., tabs, whitespace, new lines, etc.), lines (e.g., horizontal lines included as text and/or otherwise displayed), blocks (e.g., enclosing a section and/or level), different implementations of a third UI element (e.g., with separate editors for separate sections and/or levels), etc.). The definition for a dashboard is thus more easily developed and maintained. For example, an update to a definition for a datasource may involve an update to only one section of the definition for the dashboard. One user may create one part of a definition for a dashboard (e.g., a definition for a visualization) and another user may create another part (e.g., a definition for a datasource). The definition for a dashboard can also be more easily processed. For example, a dashboard engine which processes a definition for a dashboard can sequence the processing of the definition in phases (e.g., a phase for loading data, a phase for transforming data, a phase for rendering data; a pre-loading phase, a loading phase, a transforming phase, a rendering phase, etc.) and can identify corresponding parts of the definition for the dashboard (e.g., a pre-loading phase may correspond to executing pre-request code, a loading phase may correspond to submitting one or more requests, a transforming phase may corresponding to executing transform code with data received responsive to submitting the request(s), etc.).

Typically, a dashboard will include a visualization based on data received from at least one datasource. Thus, creating a definition for a dashboard will typically include operations to generate a request to submit to a datasource, submit that request, receive data from the datasource, and display the received data in a visualization. Implementations described herein simplify creating the definition. Notably, definitions for one or more datasources and visualizations can be automatically generated, and optionally, customizations and code manually input. Operations for generating the request, submitting it to a datasource, receiving data from the datasource, and displaying the visualization need not be orchestrated by the user. Instead, a dashboard engine processing a definition for a dashboard can perform none, some, or all of these options according to different implementations.

Depending on the implementation, more or less detailed definitions (e.g., definitions for datasources, variables, and/or visualizations) can be automatically generated. For example, in environments with a limited number of datasources, more detailed definitions for datasources can be generated. In other implementations, a user may be able to save a definition as a template for future use by the user or by other users. Implementations can also provide combinations of definitions; e.g., a definition for a datasource could be paired with a definition for a variable on which a request submitted to the database is commonly based, etc. Commonly-used code could also be saved, and selected by a user through another UI element (not shown) for inclusion in a definition.

Figure 1C:
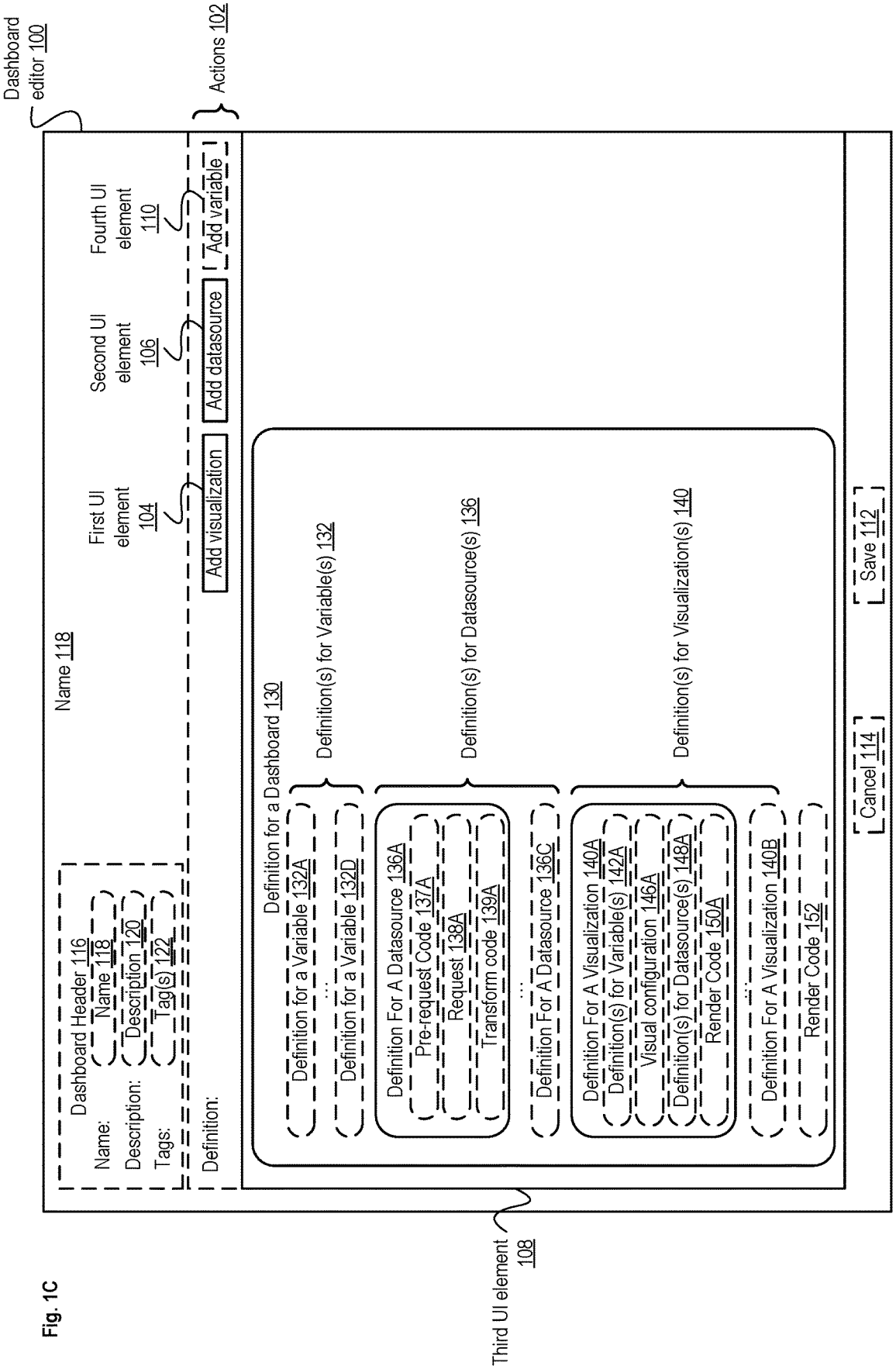
FIG. 1C is a diagram showing an exemplary UI for creating a definition for a dashboard with manually input code and user selections, according to some example implementations.

As shown in FIGS. 1A and 1C, definition for a dashboard 130 includes optional definition(s) for variable(s) 132, definition(s) for datasource(s) 136 (e.g., definition for a datasource 136A), definition(s) for visualization(s) 140 (e.g., definition for a visualization 140A), and/or optional render code 152. These elements are discussed in more detail below.

Definition for a Datasource

As shown in FIG. 1A, a definition for a datasource (e.g., definition for a datasource 136A) may include one or more of pre-request code 137A, request 138A, and transform code 139A. A definition for a datasource means a definition that describes a datasource to be used in a dashboard. A definition for a datasource may include a combination of code and data. For example, a definition for a datasource may include code (e.g., transform code 139A whose execution will generate a request to submit to the datasource and/or transform data received from the datasource) and a request to submit to the datasource (e.g., request 138A). A definition for a datasource may include other data; e.g., an identifier, a name, a type of datasource (e.g., webservice, database, file, etc.), credentials, etc.

Pre-request code is code for one or more operations to be performed before a request is submitted to the datasource (such operations are also referred to as pre-request operations); e.g., such operation(s) may include customizing the request to be submitted, logging, authenticating the user, creating data structures to store any data received, etc. Thus, executing pre-request code causes one or more pre-request operations to be performed.

Additionally or alternatively, a definition for a datasource may include a request (e.g., request 138A). A request is a command submitted to a datasource which may result in data being returned (e.g., a query, an API call, etc.). A request, as described in a definition for a datasource, may include a variable for which a definition has been included in the definition for the dashboard. A dashboard engine which supports variables (and definitions therefor), when interpreting such a request, will substitute a value for the variable included in the request in some implementations. The value may be a default value (i.e., a value for the variable if no value is explicitly set), a value input via a UI element in the dashboard (e.g., a UI element such as that referenced in block 197), a value set for the variable by code, etc.

Additionally or alternatively, a definition for a datasource may include transform code (e.g., transform code 139A). Transform code is code for one or more operations that are to be performed after a request is submitted to the datasource (such operations are also referred to as transform operation(s)); e.g., if data is received from the datasource responsive to submitting the request, such operations may include manipulating the data, logging, storing data in data structures, etc.; if data is not received, such operations may include error handling, reporting, etc. Thus, executing transform code causes one or more transform operations to be performed.

Definition for a Visualization

As shown in FIG. 1A, a definition for a dashboard (e.g., definition for a dashboard 130) may include one or more definitions for visualizations (e.g., definition for a visualization 140A as shown in FIG. 1A, definition(s) for visualization(s) 140 as shown in FIG. 1C). A definition for a visualization is a definition that describes a visualization to be displayed in a dashboard. A definition for a visualization may include a combination of code and data. For example, a definition for a visualization may include code (e.g., render code 150A, which may include instructions, the execution of which will combine data on which the display of the visualization will be based), definitions (e.g., one or more definitions for datasources (e.g., definition(s) for datasource(s) 148A)), and/or one or more definitions for variables (e.g., definition(s) for variable(s) 142A)), a visual configuration (e.g., visual configuration 146A), etc. A definition for a visualization may contain other data (e.g., an identifier, a type, a name, etc.). When a definition for a dashboard includes a definition for a visualization, processing the definition for the dashboard causes the display of the visualization.

A definition for a visualization may include one or more definitions for datasources (e.g., definition(s) for datasource(s) 148A) such that the definitions for datasources are associated with the definition for the visualization (e.g., definition for a visualization 140A). Definitions for datasources have been discussed (e.g., in relation to definition for a datasource 136A). However, in some implementations, a definition for a datasource included in a definition for a visualization may only be used by that visualization and its definition. Put differently, only definitions, code, and/or other data associated with the definition for the visualization may use such a datasource. For example, data received from such a datasource may be available for use only by the visual configuration, render code, or other elements of the definition for the visualization. Thus, the received data, and/or data made available by any transform operation of the definition for the datasource, and/or data made available by any render operation of the definition for the visualization, may be available for display only by the visualization in such implementations.

A definition for a visualization may include a visual configuration (e.g., visual configuration 146A). A visual configuration includes information relating to visual characteristics of a visualization (e.g., an appearance of the visualization). For example, a visual configuration included in a definition for a visualization corresponding to a given type of visualization (e.g., a bar chart) may describe visual characteristics such as properties of the visualization (e.g., a title, legend, axes, etc.) and related aspects (e.g., where the data is stored that the visualization is based on, the one or more series of that data to be displayed, etc.).

A definition for a visualization may also include render code (e.g., render code 150A). Render code is code for one or more operations that are to be performed on data for that data to be displayed by one or more visualizations in a dashboard (such operations are also referred to as render operation(s)). Such operations may include manipulating the data (e.g., combining data from multiple datasources), logging, making data available for display by the visualization, loading the visualization with data, etc. Thus, executing render code causes one or more render operations to be performed. In contrast with transform operations, in some implementations, render operations can apply to data from more than one datasource. Render operations may differ from transform operations in other ways (e.g., the time at which the operations are performed in relation to the processing of a definition for a dashboard). In some implementations, render code can access a visualization which is displayed or to be displayed; e.g., through the visualization's definition. In some implementations, render code which is included in a definition for a visualization may access that visualization programmatically. Additionally or alternatively, render code at the same level of one or more definitions for visualizations in a definition for a dashboard (e.g., render code 152) may access one or more of those visualizations (e.g., visualizations corresponding to definitions for visualizations 140A-B) programmatically. Render code may, for example, configure an appearance of a visualization based on the data to be displayed by the visualization, such as to scale the data to be displayed, to change the type of visualization, to filter data, etc.

Definition for a Variable

As discussed, a variable is a reference to a value which can be changed, and a type of variable may refer to a type of data that the variable stores. A definition for a variable is a definition that describes a variable to be used in a dashboard. A definition for a variable (e.g., one of definition(s) for variable(s) 132 or definition(s) for variable(s) 142A) may include data such as one or more of an identifier for the variable, a type of the variable, a name of the variable, a description for the variable, one or more default value(s) for the variable, one or more values that a user may select from as a value for the variable, whether a UI element is to be displayed to allow a value to be input for the variable; a preferred layout for any such UI element, other elements relating to the configuration of the UI element (e.g., a specific type and/or configuration of UI element to be displayed), etc.

A variable can be used in different ways in a dashboard or its definition. A variable provides for configurability; in some implementations, a dashboard engine processing a definition for a variable may display a UI element that allows for a value of the variable to be input. A value for a variable can be changed in other ways (e.g., by code). Thus, a variable can be used to configure different aspects of a dashboard as expressed in its definition. For example, a variable can be used in relation to a datasource. As a specific example, a request to submit to a datasource may be based on a value for the variable; the type of the variable may correspond to a type of a field of records in that datasource, and the value for the variable may filter those records. A variable can be used in other ways, such as in relation to a visualization. As a specific example, a visual configuration of a definition for a visualization may include a type which is based on a value for a variable, such that changing the value changes the type of the visualization (e.g., from bar chart to line chart).

In some implementations, a definition for a variable included in a definition for a visualization is only available to that definition for a visualization and the associated visualization; i.e., neither the definition for a variable, the variable, nor a value thereof can be used by another definition in the definition for the dashboard (or the code of that another definition). In some implementations, a definition for a variable included in a definition for a dashboard may be included at the same level as a definition for a visualization (e.g., definition for a variable 132A shown in FIG. 1C) or included in a definition for a visualization (e.g., definition for a visualization 140A) interchangeably. For example, if a definition for a dashboard includes only one definition for a visualization and one definition for a variable, some implementations may allow the variable to be included at the same level of, or in, the definition for the visualization; in either case, the definition for the variable is included in the definition for the dashboard. In some implementations which display a UI element that allows for a value for a variable to be input, the UI element may be associated with a visualization or associated with the dashboard more generally, based on whether the definition for the variable is included in a definition for a visualization or in the definition for the dashboard more generally. A specific example is discussed in relation to FIG. 1C below.

Dashboards

Figure 1D:
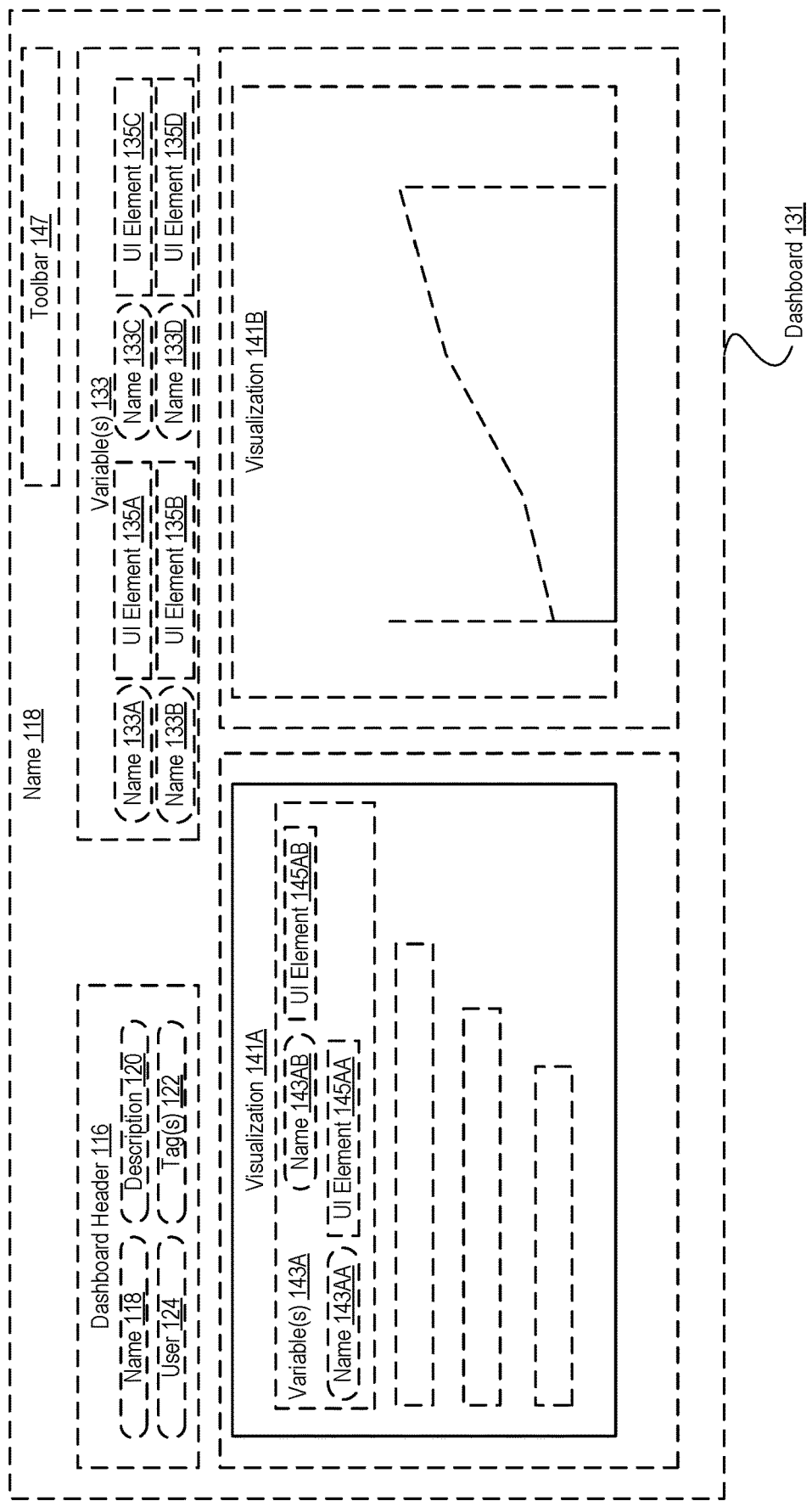
FIG. 1D is a diagram showing an exemplary dashboard created with an exemplary UI for creating a definition for a dashboard with manually input code and user selections, according to some example implementations.

FIG. 1D is a diagram showing an exemplary dashboard 131 created with an exemplary UI for creating a definition for a dashboard with manually input code and user selections, according to some example implementations. Dashboard 131 includes a name 118, an optional toolbar 147, an optional dashboard header 116, optional variable(s) 133, a visualization 141A, and an optional visualization 141B.

With reference to FIG. 1C, dashboard header 116 includes the name 118 of the dashboard 131, as well as an optional description 120 and tags 122 for the dashboard. In some implementations, the dashboard header 116 is stored separately from the definition for a dashboard 130. Storing the dashboard header separately may facilitate storing and searching for a definition for a dashboard. A dashboard header may include data which facilitates differentiating between definitions for dashboards. For example, a user could search for dashboard based on a name (e.g., name 118) and/or based on one or more of the tags 122. In other implementations, the dashboard header 116 is stored together with the definition for the dashboard 130. As shown in FIG. 1C, the dashboard header 116 can be displayed in the dashboard editor 100 in a separate part from the definition for a dashboard 130. The dashboard header 116 may optionally include other information such as a user 124 (e.g., the user that created the definition for a dashboard 130, the user which is currently editing the definition for a dashboard, the user which is currently viewing the dashboard 131, etc.), a creation date, a last modified date, a status of the definition for the dashboard or of the dashboard (e.g., whether the dashboard or its definition is locked for editing, whether the dashboard or its definition is shared), a number of users concurrently viewing the dashboard, etc.

Exemplary dashboard 131 is shown with an optional toolbar 147. The toolbar 147 may include one or more UI elements (not shown in FIG. 1D). For example, UI elements shown in toolbar 147 may include one or more UI elements to: toggle between the dashboard and its definition, refresh the dashboard (e.g., reload data on which one or more visualizations are based), display additional information about the dashboard (e.g., help information, support information, advertising information, etc.), take a screenshot of the dashboard, collect troubleshooting or usage information, etc. In some implementations, the UI elements provided may be described in a separate definition in the dashboard, in a dashboard header, or otherwise. In other implementations, the toolbar 147 may not be configurable for individual dashboards, but if configurable, may be configurable for one or more user profiles, one or more user groups, one or more organizations, etc.

Returning to FIG. 1D, dashboard 131 includes variable(s) 133 and for visualization 141A, variable(s) 143A. Variable(s) 133 include pairs of names and UI elements: a name 133A and UI element 135A, a name 133B and UI element 135B, a name 133C and UI element 135C, and a name 133D and UI element 135D. Each of these pairs correspond to one of the definition(s) for variable(s) 132 shown in FIG. 1C. Taking the example of name 133A and UI element 135A, the name 133A corresponds to a name included in the definition for a variable 132A whereas the UI element 135A is a UI element that allows for a value for the variable 132A to be input. Such a UI element (e.g., UI element 135A) may be configured to correspond with additional information included in the definition for a variable. For example, the UI element may be configured to correspond with the type of the variable. For a variable which stores a date, a UI element may be configured to allow input of a date; e.g., the UI element may only allow text input in a particular format, the UI element may be a graphical element that allows for choosing a date from a calendar (e.g., a "datepicker" element), the UI element may allow selection of one or more dates from a dropdown list etc. For a variable of another type, a UI element may be configured differently (e.g., as a "timepicker" element for a variable which stores a time, a text input field for a variable which stores text, a "slider" or "spinner" for a variable which stores a numerical value, a set of radio buttons for a variable which stores an enumeration, etc.). As another example, a UI element may be configured to correspond with one or more default values included in the definition for the variable. In the case of a variable which stores a date, a default value corresponding to a date may be included in the definition for the variable. A UI element that allows for a value for that variable to be input may be configured to display that default value as an initial value. One of skill in the art will recognize that although implementations are discussed where a UI element may be displayed for a variable, other implementations may display multiple UI elements for a variable (e.g., for a variable which stores a date, multiple UI elements may be displayed to allow a user to select one or more of the day, month, and year).

The pairs of names and UI elements displayed as variable(s) 133 may also be displayed in different layouts. As shown in FIG. 1D, a name (e.g., name 133A) and corresponding UI element (e.g., 135A) for a variable are juxtaposed. This layout facilitates identifying what the variable represents. However, this layout is exemplary and not limiting. The layout applied in any given dashboard may be determined based on one or more factors, including the number of variables for which UI elements are to be displayed, the screen space which can be afforded to the names and UI elements for those variables, the form factor of the screen, the orientation of the screen (e.g., portrait vs. landscape), the font size and UI element size, user preference, additional information on layout included in the definitions for the variables, etc.

In addition to variable(s) 133, FIG. 1D shows variable(s) 143A for visualization 141A. Variable(s) 143A include pairs of names and UI elements: a name 143AB and UI element 145AB, and a name 143AA and UI element 145AA. These pairs correspond to the definitions for variables 142A shown in FIG. 1C (but are not shown in FIG. 1C). As discussed, in some implementations, the variables corresponding to the definitions for variables 142A may only be used by visualization 141A. FIG. 1D helps illustrate an exemplary advantage of such implementations. For example, a value input in UI element 145AB may affect visualization 141A (e.g., if the value affects the data on which visualization 141A is based) but will not affect visualization 141B. Meanwhile, in other implementations, one or more of variables 133 may be used by one or more of visualization 141A and visualization 141B. Thus, a user creating a dashboard can create interactions which affect multiple visualizations (with a variable that is used by multiple visualizations) and/or interactions which affect individual visualizations (with a variable that is used by only one visualization).

Exemplary dashboard 131 includes visualization 141A and optional visualization 141B, which respectively correspond to definition for a visualization 140A and optional definition for a visualization 140B shown in FIG. 1C. Below the area of visualization 141A corresponding to variable(s) 143A, three horizontally-oriented bars are shown. These bars indicate an exemplary graphical depiction of data. The oblique line connected at each end with vertical lines in visualization 141B indicates another exemplary graphical depiction of data. For a given visualization, the depiction may be based on the data to be depicted and the visual configuration of the visualization. The data to be depicted may originate from one or more datasources, definitions for which are included in the definition for the dashboard (none, some, or all of such definition(s) for datasource(s) may be included in the definition for the visualization). In some implementations, the data may originate from the definition for a dashboard itself. For example, a definition for a dashboard or definition for a visualization may include data (e.g., "dummy" data to be displayed for demonstration purposes, one or more data points (also referred to as datapoints) and/or data series (also referred to as dataseries) to be displayed for comparison purposes against data from one or more datasources, data which originated from one or more datasources which was subsequently stored in the definition for the visualization, etc.). In other implementations, a visualization may include other elements not shown in FIG. 1D; e.g., a toolbar (such as toolbar 147), a title, a legend, one or more UI elements, etc. Moreover, visualizations may be scrollable, dockable, resizable, rotatable, etc. in some implementations.

In some implementations, the dashboard may include elements not shown in FIG. 1D. For example, a dashboard may include one or more tiles, navigational elements, or other fixed or dynamic content. In some implementations, the dashboard may be addressable via a URL (e.g., a URL which includes the name 118). In some implementations, a value for a variable included in the definition for the dashboard may be added as a parameter of the URL, such that, when the definition for the dashboard is processed and the dashboard displayed, the value of the variable is set to the parameter of the URL. A parameter of a URL (also referred to as a URL parameter) is a portion of a URL which provides additional information to software interpreting the URL. Setting a URL parameter with a value for a variable facilitates loading the dashboard with that value for the variable set (e.g., the URL with the parameter may be bookmarked in a web browser, and loading the dashboard at the bookmarked URL may cause the dashboard to be displayed with the value for the variable). For example, a URL parameter for a dashboard whose definition includes a variable with identifier "date1" (see, e.g., FIG. 2B) may be added as "?date1=value" where "value" is a value to be set for that variable. On loading the definition for the dashboard, a dashboard engine may substitute the value "value" for the variable with identifier "date1" as needed (e.g., in a request which is based on that variable).

Creating a Definition for a Dashboard

FIGS. 2A through 2E show exemplary definitions for dashboards. Taken together, the figures show an example of creating a definition for a dashboard with manually input code and user selections. At one or more of the steps represented by these figures, the resulting combination of code and definitions can be stored as a definition for a dashboard. The definition for a dashboard 130 shown in these figures, including its structure and content, is exemplary and not limitative.

Definition for a Dashboard

Figure 2A:
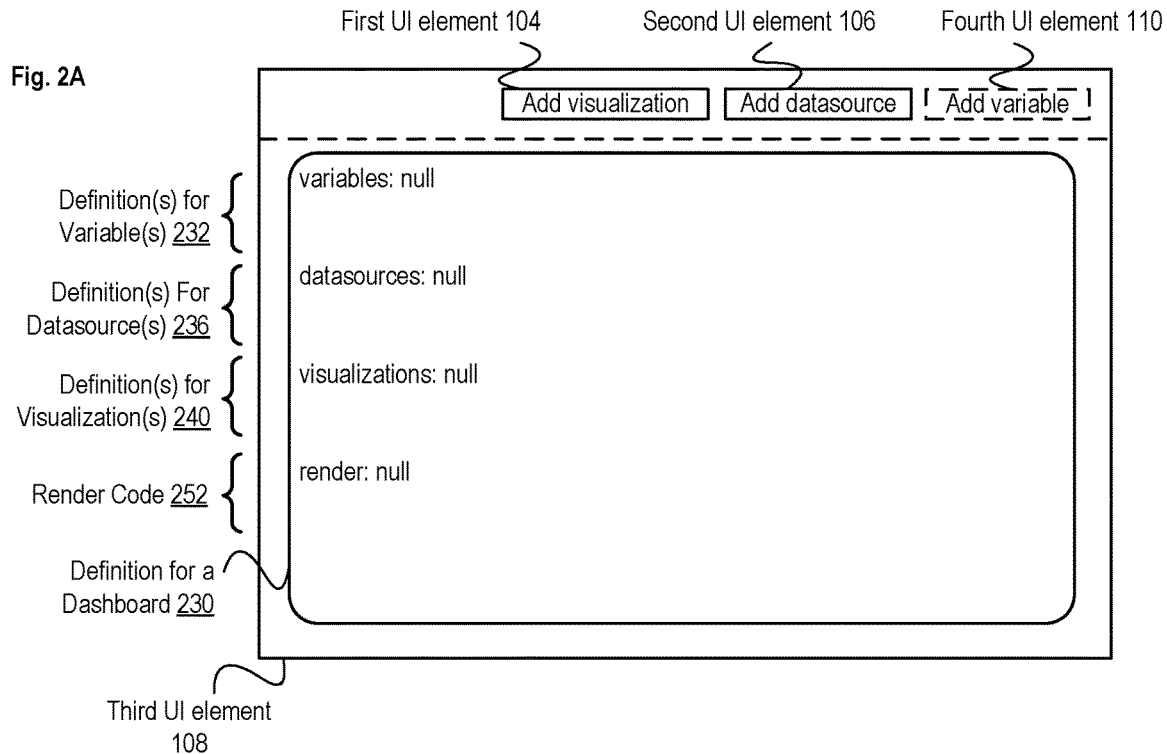
FIG. 2A is a diagram showing an exemplary definition for a dashboard according to some example implementations.

FIG. 2A is a diagram showing an exemplary definition for a dashboard according to some example implementations. FIG. 2A shows a third UI element 108 in which a definition for a dashboard 230 is displayed. FIG. 2A also shows a first UI element 104, second UI element 106, and fourth UI element 110 which have been discussed previously. The definition for dashboard 230 shows sections corresponding to definition(s) for variable(s) 232, definition(s) for datasource(s) 236, definition(s) for visualization(s) 240, and render code 252. Corresponding to these sections, the third UI element 108 respectively shows the elements "variables: null", "datasources: null", "visualizations: null", and "render: null".

In the implementation shown, the words "variables", "datasources", "visualizations", and "render" serve to demarcate (together with a colon (":")) the corresponding sections of the definition for the dashboard. In each case, the word together with a colon indicates the beginning of the corresponding section. The word "null" indicates that no corresponding definitions for variable(s), datasource(s), visualization(s), nor render code is included in the definition for the dashboard. In some implementations, the definition for a dashboard shown in FIG. 2A may be a default definition for a dashboard which is displayed in certain circumstances; e.g., when the third UI element is first displayed (e.g., in block 167 shown in FIG. 1B), when a user first creates a new definition for a dashboard, etc.

Definition for a Variable

Figure 2B:
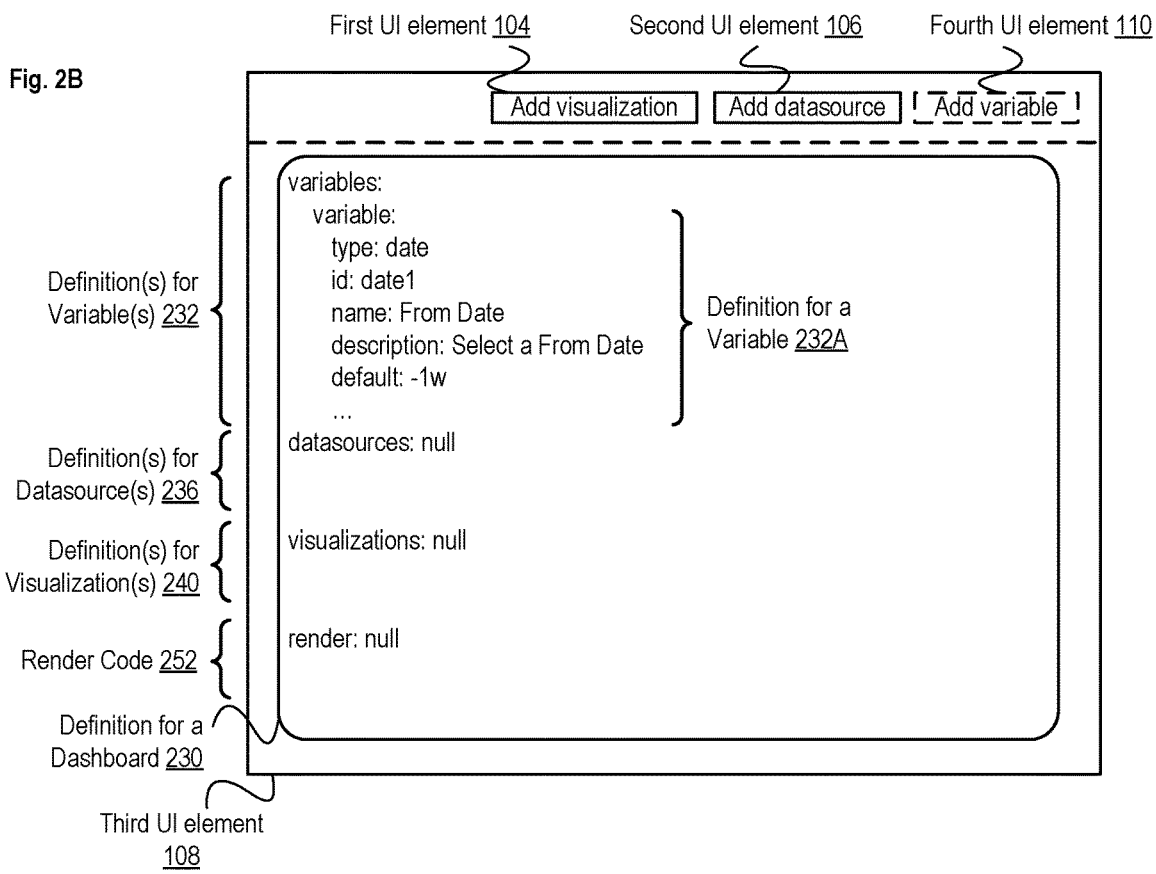
FIG. 2B is a diagram showing an exemplary definition for a dashboard that includes a definition for a variable, according to some example implementations.

FIG. 2B is a diagram showing an exemplary definition for a dashboard that includes a definition for a variable, according to some example implementations. Like FIG. 2A, FIG. 2B shows elements 104, 106, 110, 236, 240, and 252. However, FIG. 2B shows a third UI element 108 in which a definition for a dashboard 230 is displayed with a definition for a variable 232A included in definition(s) for variable(s) 232. Specifically, the definition for a variable (demarcated with "variable:" and with its elements indented) includes a type ("date"), identifier ("Date1"), a name ("From Date"), a description ("Select a From Date"), a default value ("−1w") and optionally other elements (indicated by an ellipsis). In some implementations, a definition for a variable may have built-in elements that are associated with the variable despite not being shown in the third UI element. For example, a definition for a variable may include a "value" element to store the value referenced by the variable (e.g., a value input through a UI element, a value which is assigned to the variable in code, etc.). In other implementations, a dashboard editor 100 may prohibit a user from including such built-in elements in a definition for a variable or in customizations therefor.

In some implementations, a dashboard engine which processes the definition for a dashboard 130 as shown in FIG. 2B may display in a corresponding dashboard 1) the name "From Date"), 2) a UI element that allows for a date to be input as a value for the variable (with id "Date1"), 3) in that UI element, a default value for the variable of the date a week before the present date (to correspond to "−1w"), and/or 4) the description (e.g., as a tooltip, as subscript under the variable's name, on a user selecting a help icon associated with the UI element, etc.). In some implementations, code or an element of a definition included in the definition for a dashboard 130 may reference the variable by its identifier (i.e. "Date1"), name (i.e., "From Date"), or by other means (e.g., by introspecting the definition for a variable 232A). The definition for a variable 232A may have been included in the definition for a dashboard 230 as a result of 1) executing block 165 to accept a selection of a type of variable (i.e., type "date") from a user through the fourth UI element 110; 2) executing block 183 to automatically generate the definition for a variable 232A of the selected type (i.e., type "date"); 3) executing block 186 to display the definition for the variable 232A in the third UI element 108, and 4) accepting manually input customizations through the third UI element (e.g., to the element demarcated with "default:", to the element demarcated with "description:", etc.).

Definition for a Datasource

FIG. 2C is a diagram showing an exemplary definition for a dashboard that includes a definition for a datasource, according to some example implementations. Like FIG. 2B, FIG. 2C shows elements 104, 106, 110, 232, 232A, 236, 240, and 252. However, FIG. 2C shows a third UI element 108 in which a definition for a dashboard 230 is displayed with a definition for a datasource 236A included in definition(s) for datasource(s) 236. Also, FIG. 2C shows, included in the definition for a datasource 236A, pre-request code 237A (demarcated with "prerequest:" and with a value "null"), request 238A (demarcated with "request:" and with a value "/service/metrics/?from={date1. value}" and transform code 239A (demarcated with "transform:" and with a value "null"). The definition for a datasource (demarcated with "datasource:" and with its elements indented) also includes a type ("webservice"), id ("webservice1"), a name ("Server Metrics"), a method ("GET"), a body ("null") and optionally other elements (indicated by various ellipses). In some implementations, a definition for a datasource may have built-in elements that are associated with the datasource despite not being included in its definition; e.g., a definition for a datasource may include a "data" element (which stores any data received responsive to submitting a request to the datasource). In other implementations, a dashboard editor 100 may prohibit a user from including such built-in elements in a definition for a datasource or in customizations therefor.

The definition for a datasource 236A may have been included in the definition for a dashboard 230 as a result of 1) executing block 173 to accept a selection of a type of a datasource (i.e., of type "webservice") from a user through the second UI element 106; 2) executing block 177 to automatically generate the definition for the datasource 236A of the selected type (i.e., type "webservice"); 3) executing block 186 to display the definition for the datasource 236A in the third UI element 108; and 4) accepting manually input customizations (e.g., to the element demarcated with "request:", to the element demarcated with "method:", etc.).

The value of "null" for the pre-request code 237A, transform code 239A, and "body" element of the definition for the datasource may indicate that code and/or data has not been input for these elements of the definition. Also, the text "{date1.value}" in the "request" element indicates that a value of the variable with identifier "date1" (i.e., corresponding to definition for a variable 232A) is to be substituted in the "request" element when processed by a dashboard engine. In some implementations, the definition for a datasource 236A, as generated, may not include such a reference to a variable. In those implementations, the reference may have been included in the definition for a datasource as a result of executing block 189, in which customizations for a request to submit to the selected datasource are accepted.

In some implementations, a dashboard engine which processes the definition for a dashboard 130 as shown in FIG. 2C may 1) execute the pre-request code ("null") or skip executing pre-request code (because no code has been input for pre-request code 237A); 2) load the element "value" of variable with identifier "date1" as referenced in the "request" element with a value for that variable (e.g., the last value input for the variable via a UI element, a default value corresponding to "–1w" as defined in the definition for the variable 232A, etc.); 3) submit an HTTP request (corresponding to the value "webservice" of element "type") to a webservice addressable at "service/metrics/" with a) a request parameter "?from={date1.value}" (where "{date1.value}" has been substituted, as previously described), b) the HTTP method GET (corresponding to the value "GET" of the element "body"), and c) with an empty body (corresponding to the "null" value for the "body" element); 4) store any data received from the datasource responsive to submitting the request in an element or built-in element of the definition for the datasource (e.g., in a "data" element); and/or 5) execute transform code ("null") or skip executing transform code (because no code has been input for transform code 239A).

Figure 2D:
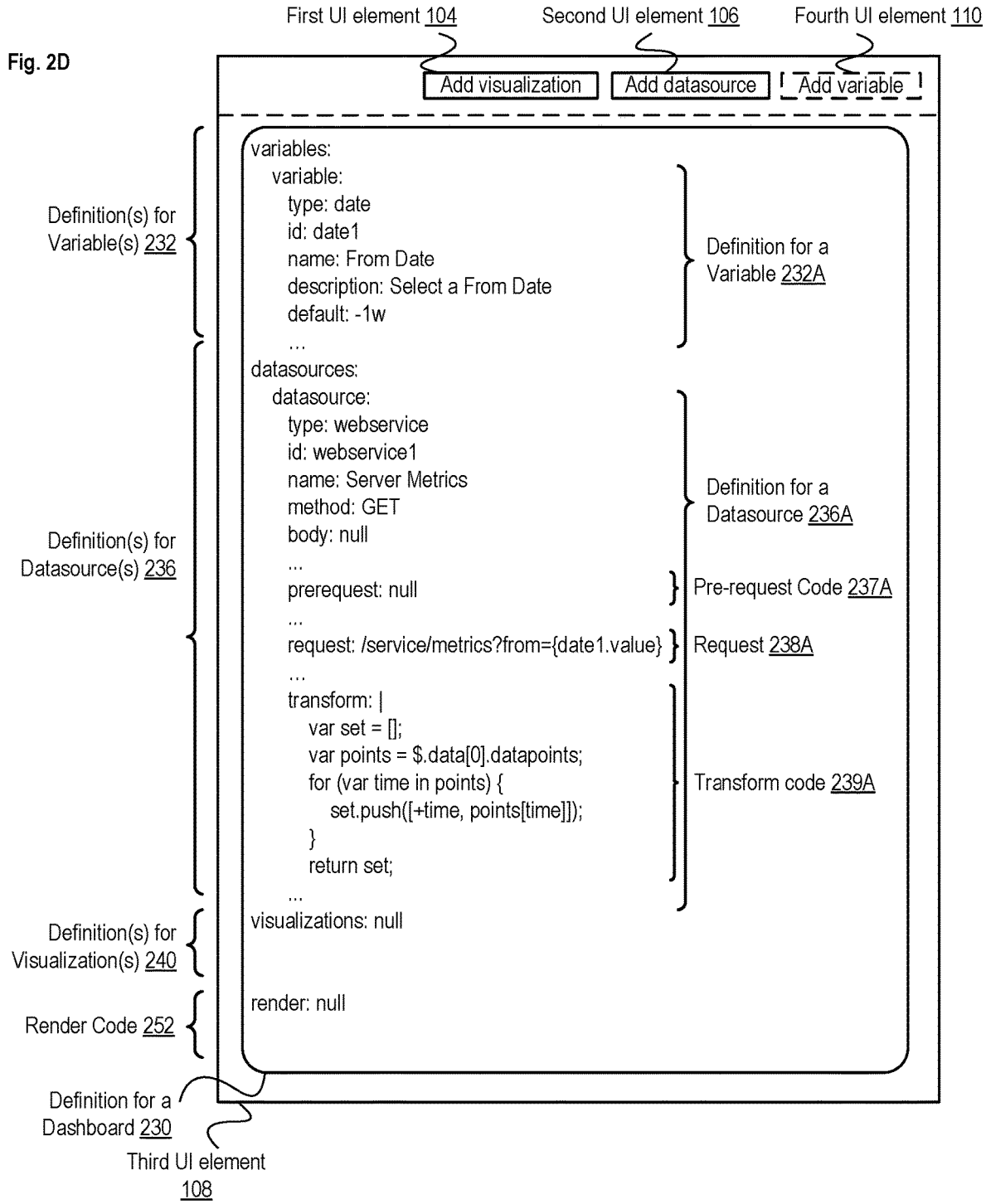
FIG. 2D is a diagram showing an exemplary definition for a dashboard that includes a different definition for a datasource, according to some example implementations.

Compared to FIG. 2C, FIG. 2D shows additional detail in the definition for a datasource 236A. Specifically, the definition includes code that has been input as transform code 239A. The code may have been included as the transform code 239A as a result of executing block 187, in which manually input customizations (including the variable referenced in the request 238A) and code is accepted through the third UI element 108. In broad terms, the operations cause the transformed data (i.e., the data returned in the variable named "set" to the caller of the transform code 239A) to be in a different format from that in which the data is received from the corresponding datasource (i.e., stored in the variable ".data"). This transformed data could be further manipulated in other code (e.g., code whose execution will combine the transformed data with data from another datasource, such as render code).

The lines of code shown in transform code 239A can be described as follows: 1) a new line is designated with the character "I"; 2) a variable with name "set" is declared; 3) a variable with name "points" is declared, and a value assigned to it, where the value is the "datapoints" attribute of the zero-th element in an array attribute named "data" in a built-in variable (designated with "S"); 4) a "for" loop is declared wherein the loop iterates for each value in the variable named "points," such value is stored in a variable named "time"; 5) for each iteration of the "for" loop, an entry is added to the variable named "set", where the entry includes an index (incremented relative to the last value for the index) and the value stored in the variable named "points" at that index; 6) the "for" loop declaration is ended with a curly brace; 7) the variable with name "set" is returned to the caller of the transform code.

Figure 2E:
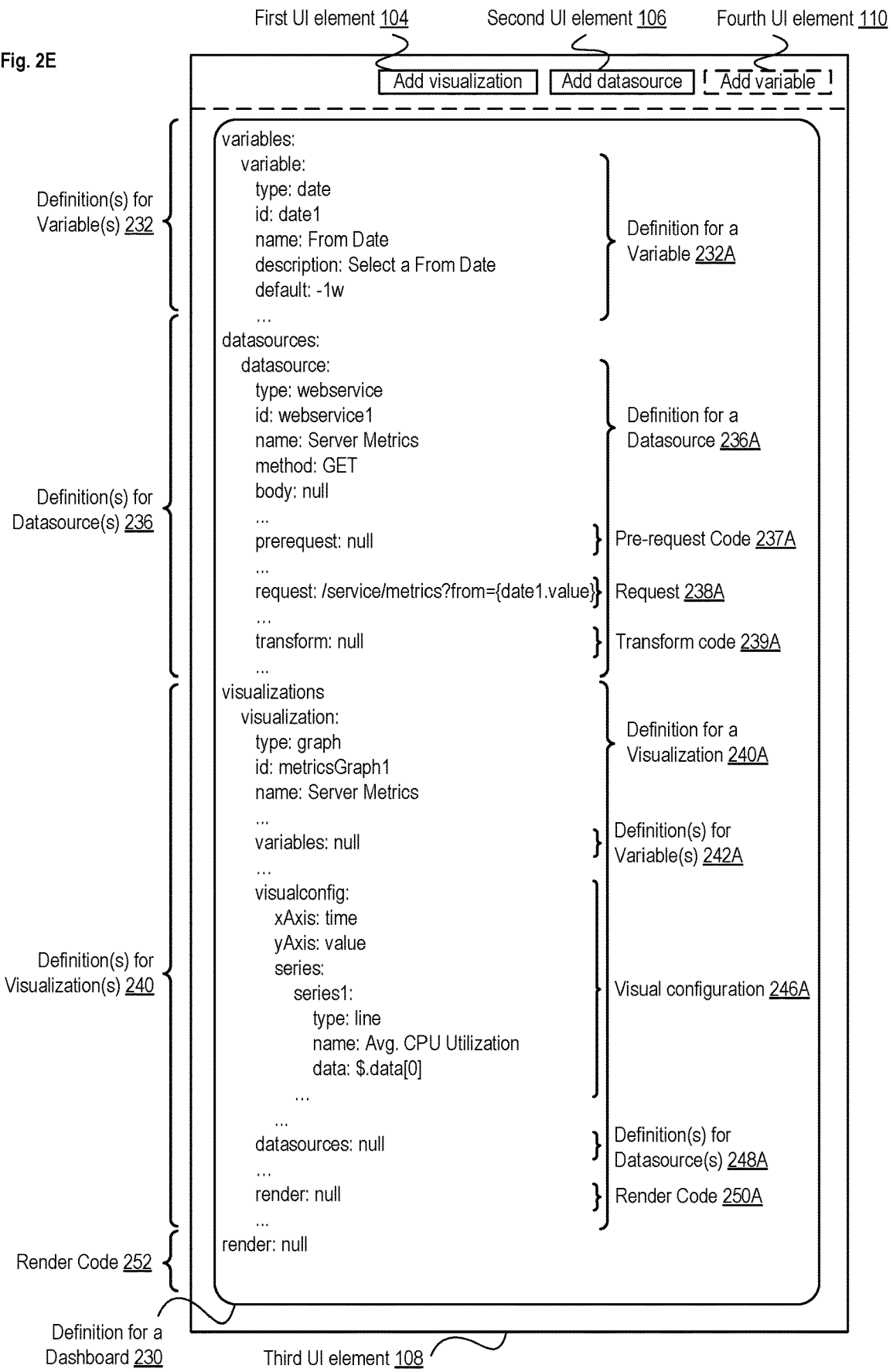
FIG. 2E is a diagram showing an exemplary definition for a dashboard that includes a definition for a visualization, according to some example implementations.

Inputting code and/or data may not be needed for a particular definition for a datasource or use of that datasource. For example, responsive to a request being submitted, data may be received and stored in an in-built or input element of the definition for the datasource and that data used without being processed by transform code. In other implementations, pre-request code may generate a request to submit to the datasource; one or more values for variables inputted and included in the request may be substituted; and/or transform code may be executed. Thus, inputting code and/or data in a definition for a datasource may be performed to varying extents according to the need to interact with the datasource and/or manipulate data received from it. These possibilities provide significant flexibility when creating a definition for a dashboard. For example, a dashboard created using the implementations described herein can interact with any manner of datasources, and manipulate any manner of data received from them, when the definition for the dashboard includes the appropriate customizations and/or code.

Definition for a Visualization FIG. 2E is a diagram showing an exemplary definition for a dashboard that includes a definition for a visualization, according to some example implementations. Like FIG. 2C, FIG. 2E shows elements 104, 106, 110, 232, 232A, 236, 236A, 237A, 238A, 239A, 240, and 252. However, FIG. 2E shows a third UI element 108 with a definition for a visualization 240A included in the definition for a dashboard 230. Definition for a visualization 240A includes definition(s) for variable(s) 242A, visual configuration 246A, definition(s) for datasource(s) 248A and render code 250A. Definition for a visualization 240A (demarcated with "visualization:" and with its elements indented) also includes a type ("graph"), identifier ("metricsGraph1"), a name ("Server Metrics") and optionally other elements (indicated by an ellipsis).

Definition(s) for variable(s) 242A, definition(s) for datasource(s) 248A, and render code 250A are respectively demarcated with "variables:", "datasources:", and "render:" like definition(s) for variable(s) 232, definition(s) for datasource(s) 236, and render code 252. Visual configuration 246A includes the following elements: xAxis (with value "time"), yAxis (with value "value"), a series element, and optionally other elements indicated by an ellipsis. The series element includes an element "series 1" which in turn includes a type (with value "line"), a name (with value "Avg. CPU Utilization"), data (with value "$.data[0]"), and optionally other elements indicated by an ellipsis. In some implementations, a definition for a visualization may have built-in elements that are associated with the visualization despite not being included in its definition.

The definition for a visualization 240A may have been included in the definition for a dashboard 230 as a result of 1) executing block 169 to accept a selection of a type of a visualization (i.e., of type "graph") from a user through the first UI element 104; 2) executing block 171 to automatically generate the definition for the visualization of the selected type (i.e., type "graph"); 3) executing block 186 to display the definition for the visualization 240A in the third UI element 108; and 4) accepting manually input customizations.

In some implementations, a dashboard engine which processes the definition for a visualization 240A may display a visualization such as exemplary visualization 141B (i.e., a visualization without associated variables because definition(s) for variable(S) 242A has the value "null"). In other implementations, a visualization may be displayed with variables corresponding to the definition(s) for variable(s) 232 displayed (i.e., at least definition for a variable 232A). In some implementations, the visualization displayed will be a graph (corresponding to the value "graph" of the element "type"), with an x-axis with units of time (corresponding to the value "time" of the element "xAxis'), a y-axis with units appropriate for the data depicted in the visualization (i.e., corresponding to the value "value" of the element "yAxis"), and with a data series (corresponding to the element "series1") represented by a line (corresponding to the value "line" of element "type") with label "Avg. CPU Utilization" (corresponding to the value of element "name"). In other implementations, the visual configuration 246A may be treated by a dashboard engine as a suggestion. For example, in such implementations, the dashboard engine may determine whether a visualization can be displayed with the visual configuration included in the definition for the visualization (e.g., based on factors such as the form factor of the screen, the orientation of the screen (e.g., portrait vs. landscape), the size of the visualization, the number of data series to be displayed and data points in those series, the other UI elements to be displayed, etc.). A data series is a series of one or more data points, which each may have one or more dimensions (e.g., may be conceptualized as a single value (one dimension), a pair of values (two dimensions), a tuple of values (three dimensions), etc.). If the visualization cannot be displayed according to the visual configuration, the dashboard engine may display the visualization with another visual configuration (e.g., a configuration approximating that included in the definition for the visualization, a default configuration adjusted for the factors mentioned, etc.).

Processing a Definition for a Dashboard

Figure 3A:
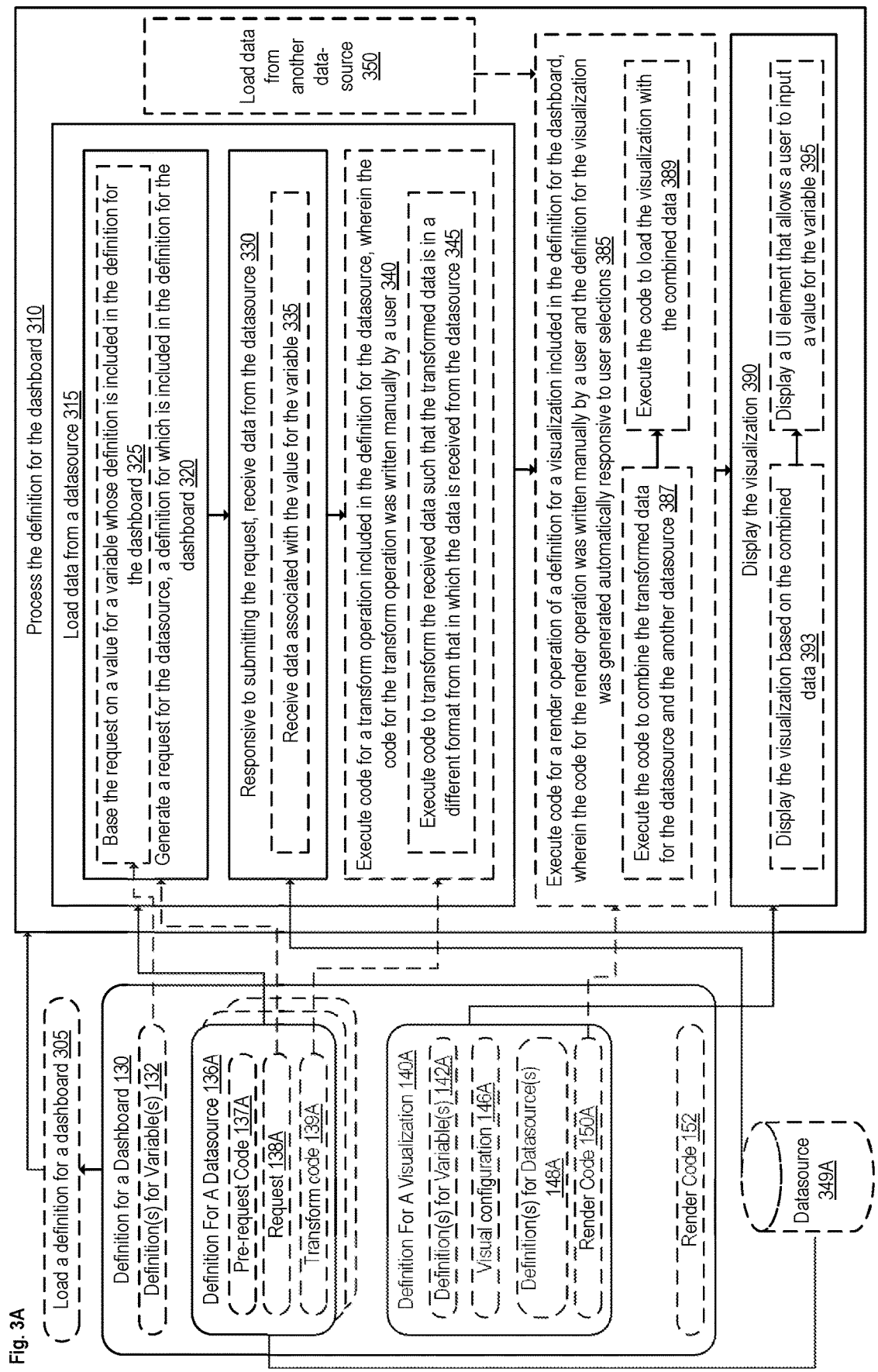
FIG. 3A is a block diagram showing a definition for a dashboard and operations for displaying the dashboard, according to some example implementations.

FIG. 3A is a block diagram showing a definition for a dashboard and operations for displaying the dashboard, according to some example implementations. Responsive to loading a definition for a dashboard 305, the definition for the dashboard is processed 310. A definition for a dashboard, when processed, causes a dashboard engine to perform operations. In some implementations, processing a definition for a dashboard causes the operations shown in FIG. 3A. However, the flexible nature of a definition for a dashboard is such that other operations are possible; the definition is customizable as described. Thus, the operations shown in FIG. 3A and other figures are exemplary and not limiting.

Processing the definition for the dashboard 310 may include loading data from a datasource 315, optionally loading data from another datasource per block 350, executing code for a render operation per block 385, and displaying the visualization 390.

In block 315, data from a datasource is loaded. In some implementations, block 315 involves processing a definition for a datasource (as indicated by the arrow from the definition for a datasource 136A to block 315). In some implementations, loading the data includes executing block 320 to generate a request for the datasource, a definition for which is included in the definition for the dashboard. Moreover, executing block 320 optionally includes executing block 325; i.e., the request to be submitted to the datasource may be based on a value for a variable (e.g., a default value, a value provided through a UI element, a value set by code) whose definition is included in the definition for the dashboard.

As another example, the definition for the dashboard may include definitions for first and second datasources (e.g., with reference to FIG. 1C, definition for a datasource 136A and 136C) and a definition for a visualization (e.g., definition for a visualization 140A). One or both of the definitions for first and second datasources may include code for a transform operation (e.g., transform code 139A and/or transform code 139C (not shown), which may be the same or different).

Figure 3B:
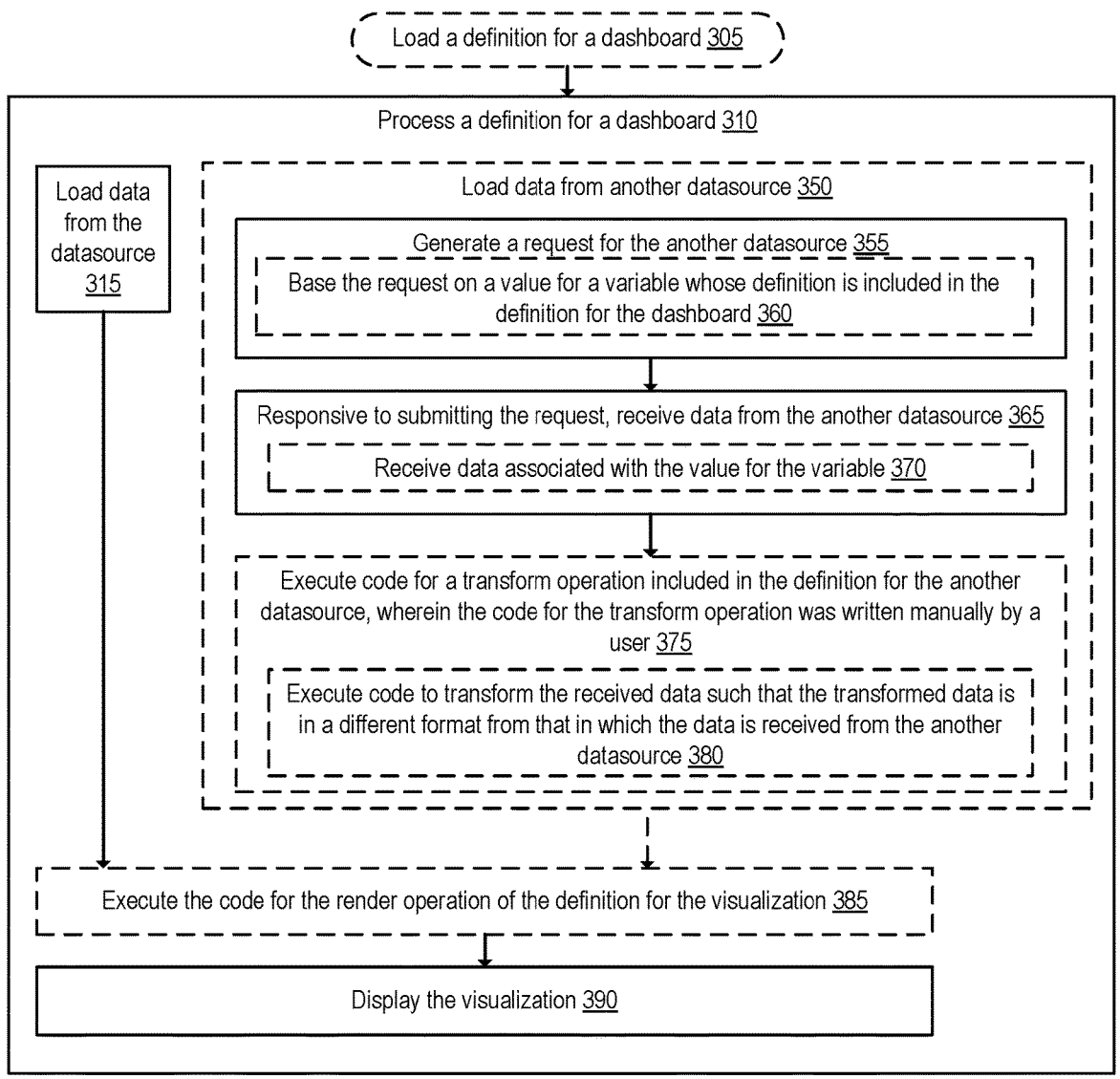
FIG. 3B is a flow diagram showing operations for processing a definition for a dashboard and displaying the dashboard, according to some example implementations.

As shown by optional block 350, processing the definition for the dashboard may include loading data from another datasource (e.g., the second datasource mentioned). As shown in FIG. 3B, executing block 350 may include executing block 355 to generate a request for the another (e.g., a second) datasource. That request may be based on a value for a variable whose definition is included in the definition for the dashboard, per block 360 (e.g., the request may be based on a value for a variable whose definition is one of the definition(s) for variable(s) 132 as indicated by the dashed arrow between that element and block 325). As indicated by the arrow between request 138A and block 320, the request generated in block 320 may be based on the request 138A included in the definition for the datasource 136A. Similarly, with reference to block 355 shown in FIG. 3B, the request generated in block 355 may be based on a request included in the definition for the another datasource (e.g., definition for a datasource 136C) (not shown in FIG. 3B).

Returning to FIG. 3A, flow passes from block 320 to block 330. In block 330, data is received from the datasource responsive to submitting the request (indicated by the arrow from optional datasource 349A to block 330). Optionally in block 335, data associated with the value for the variable is received from the datasource. Similarly, with reference to FIG. 3B, in block 365 data is received from the another datasource responsive to submitting the request generated in block 360 to that datasource. Optionally, in block 370, data associated with the value for a variable is received. In some implementations, the request submitted to the datasource and the request submitted to the another datasource are both based on a value for the same variable; in other implementations, the requests may each be based on a value for separate variables. A request to only one of the datasource and the another datasource may be based on a value of a variable in yet other implementations.

From block 330, flow passes to block 340. In block 340, code for a transform operation included in the definition for the datasource (e.g., transform code 139A) is executed. As discussed further herein, executing the transform code may cause various operations to be performed. Operations may include transforming the received data (i.e., data received from the datasource) such that the transformed data is in a different format from that in which the data is received from the datasource 345. Similarly, in FIG. 3B, code for a transform operation is executed in block 375; in block 380, executing the transform code transforms the received data (i.e., from the another datasource) such that that data is in a different format.

From block 315 and optionally from block 350, flow passes to block 385. In block 385, code for a render operation of a definition for a visualization is executed (e.g., render code 150A). In optional block 387, executing the code combines the transformed data for the datasource and the another datasource. In other implementations, one or more of the received data and the transformed data for one of the datasource can be combined with the received or transformed data of the another datasource. From optional block 387, flow passes to optional block 389. In block 389, executing the code loads the visualization with the combined data.

From block 385, flow passes to block 390 and a visualization is displayed (e.g., the visualization whose definition is the definition for a visualization 140A). Optionally in block 393, the visualization is displayed based on the combined data (e.g., the data loaded in block 389), and in block 395, a UI element is displayed that allows a user to input a value for a variable.

Exemplary Customizations and Code

As shown in FIGS. 2A through 2E, a definition for a dashboard is created through user selections and manually input customizations and/or code. The progression of FIGS. 2A through 2E showed: 1) in FIG. 2A, an initial definition for a dashboard, 2) in FIG. 2B, a definition for a dashboard including an automatically generated definition for a variable (which may include customizations), 3) in FIG. 2C, that definition for a dashboard including an automatically generated definition for a datasource (which may include customizations), 4) in FIG. 2D, that definition for a dashboard including manually input transform code, and 5) in FIG. 2E, that that definition for a dashboard including an automatically generated definition for a visualization (which may include customizations). However, a user can input other customizations and/or code to realize different functionality; any of the definitions and their elements described herein can be customized and code performing any manner of operations can be input.

Figure 4A:
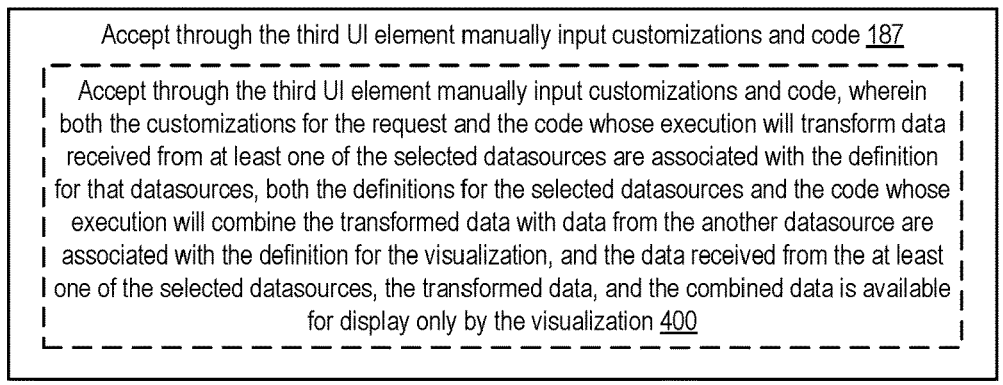
FIG. 4A is a more detailed flow diagram showing operations for creating a definition for a dashboard with manually input code and customizations, according to some example implementations.

FIG. 4A is a more detailed flow diagram showing operations for creating a definition for a dashboard with manually input code and customizations, according to some example implementations. In optional block 400, manually input customizations and code are accepted through the third UI element. The customizations are for a request to be submitted to a selected datasource and the code includes code whose execution will transform data received from a selected datasource. Both the customizations for the request and the code are associated with a definition for a datasource; both the definition for the datasource and a definition for another datasource are associated with a definition for a visualization. The data received from the selected datasource, the transformed data, and the combined data is available for display only by the visualization. In another example, in block 405 of FIG. 4B, customizations are accepted such that the request to submit to at least one selected datasource is based on the value for a variable, where the selected type of variable corresponds to a type of a field of records in that datasource, and the value for the variable is to filter those records.

In other implementations, customizations and code may include: 1) customizations for a request to be submitted to the another datasource, 2) code for a transform operation included in the definition for that datasource, 3) render code to combine data transformed by transform code included in one or both definitions for the datasources, etc. In yet other implementations, the definitions for the datasources need not be included in the definition for the visualization; they may be included at the same level of that definition. In such implementations, the data received from either datasource, the transformed data, and the combined data would be available for display by the visualization and/or by other visualizations whose definitions are included in the definition for a dashboard.

More generally, customizations can include customizing an element, and/or adding one or more elements to and/or removing one or more elements from a definition. Adding an element to a definition (e.g., an element demarcated by a tag such as "custom_element:" and including a value) allows for extensibility. For example, a user may customize a definition for a datasource to include an additional element, then reference that element in pre-request and/or transform code for that datasource. In some implementations, a dashboard engine may perform specific operations in relation to an additional element (e.g., operations relating to loading data, operations relating to displaying a visualization, etc.). In other implementations, a user can remove an element from a definition (e.g., an automatically generated definition). Removing an element may allow a user to rely on default behavior for a definition and reduce the size and/or complexity of the definition. For example, removing an element may cause a dashboard engine to infer a value for that element, if necessary, when processing the definition. For example, if an element "xAxis" is removed from the visual configuration of a definition for a visualization, the dashboard engine may apply a default value for "xAxis." Additionally or alternatively, the dashboard engine may apply a value for "xAxis" which is based on the type of data in the one or more data series to be displayed in the visualization.

And customizations of an element in a definition provide flexibility to create a wide range of dashboards to suit different needs (e.g., different depictions of data from different datasources). Customizations can include changing the value of any element in a definition, to the extent that the changed value is supported by the dashboard engine in the implementation. For example, changing the value of a type of visualization (e.g., to "video") may not be supported in a particular implementation, whereas changing the type to another value (e.g., to "scorecard") may be supported in that implementation.

Figure 4B:
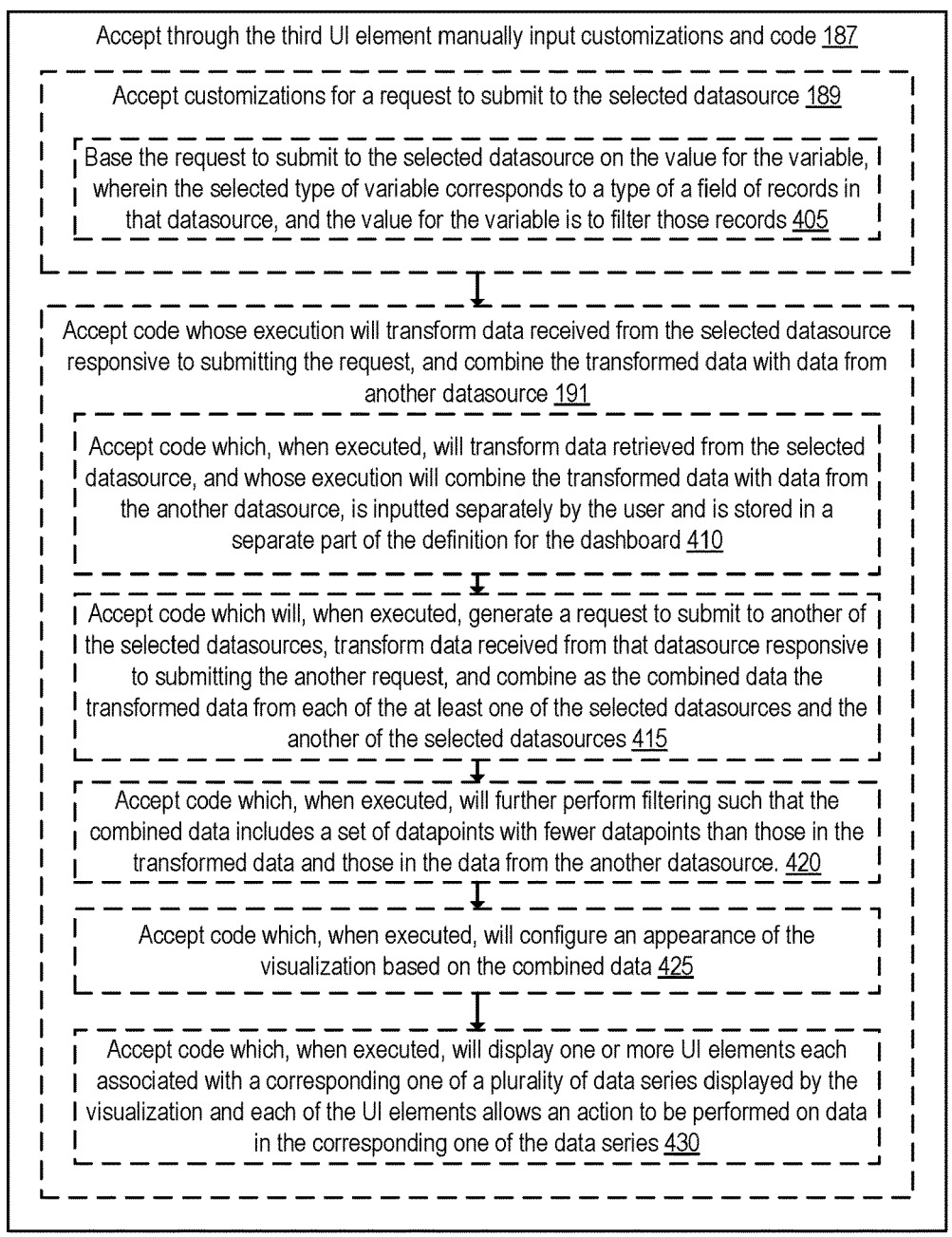
FIG. 4B is another more detailed flow diagram showing operations for creating a definition for a dashboard with manually input code and customizations, according to some example implementations.

FIG. 4B is another flow diagram showing operations for processing a definition for a dashboard and displaying the dashboard, according to some example implementations. Block 405 was described above. Optional blocks included in block 191 describe exemplary possibilities for code manually input by a user. One or more of blocks 405, 410, 415, 420, 425, and 430 can be employed in any given implementation.

In block 410, code is accepted which, when executed, will transform data retrieved from the selected datasource, and whose execution will combine the transformed data with data from the another datasource, is inputted separately by the user and is stored in a separate part of the definition for the dashboard. For example, the code whose execution will transform data may be stored as transform code, and the code whose execution will combine the transformed data may be stored as render code. From optional block 410, flow passes to optional block 415.

In block 415, code is accepted which, when executed, will generate a request to submit to the another datasource (e.g., another of the datasources for which a selection is accepted in optional block 175), transform data received from that datasource responsive to submitting the request to it, and combine the transformed data from each of the selected datasource and the another datasource. From optional block 415, flow passes to optional block 420.

In block 420, code is accepted which, when executed, will perform filtering such that the combined data includes a set of data points with fewer data points than those in the transformed data and those in the data from the another datasource. From optional block 420, flow passes to optional block 425.

In block 425, code is accepted which, when executed, will configure an appearance of the visualization based on the combined data. For example, the code may change the type of visualization, the type of one or more data series to be displayed, the units to be employed in displaying one or more data series, the color of one or more data points or data series, etc. Configuring the appearance of the visualization may be to improve the depiction of the data; e.g., to emphasize or de-emphasize one or more aspects (e.g., change the color, size, or other formatting of one or more data points, data series, and/or the visualization itself), make the depiction more easily viewable (e.g., in a given screen, on a given device, in the context of other elements in the dashboard, in the context of the data points and/or data series displayed), etc. From optional block 425, flow passes to optional block 430.

Figure 4C:
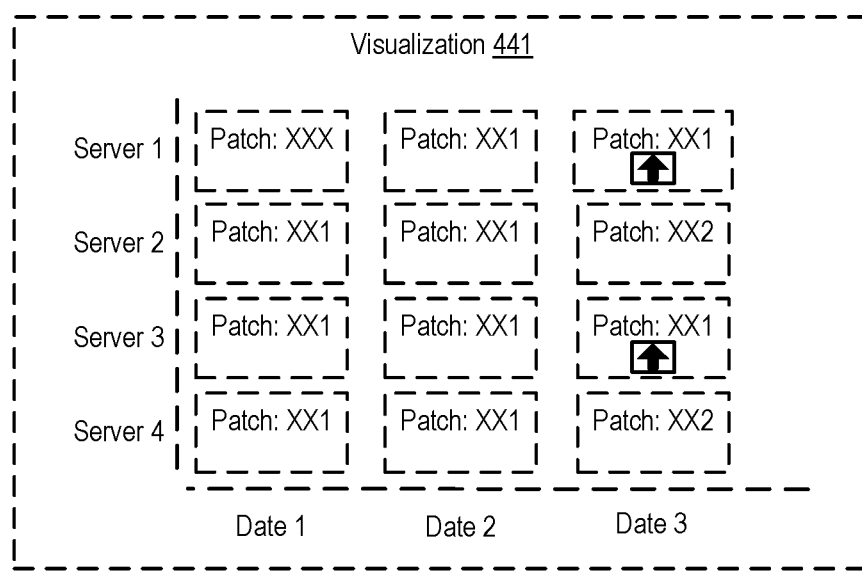
FIG. 4C is a diagram showing an exemplary visualization including UI elements that allow an action to be performed relative to data displayed by the visualization.

In block 430, code is accepted which, when executed, will display one or more UI elements each associated with a corresponding one of a plurality of data series or data points displayed by the visualization and each of the UI elements allows an action to be performed which relates to the corresponding one of the data series or data points. An example is shown in FIG. 4C. Visualization 441 shown in FIG. 4C shows a server patch identifier (i.e., XXX, XX1, XX2) by server (i.e., Server 1, Server 2, Server 3, Server 4) and by date (i.e., Date 1, Date 2, Date 3). On Date 3, Server 2 and Server 4 have patch identifier XX2. Server 1 and Server 3 have patch identifier XX1. In this exemplary visualization, the data points corresponding to Server 1 on Date 3, and Server 3 on Date 3, each have a UI element displayed (shown as a vertical arrow in a box) that allows an action to be performed which relates to the corresponding data. For example, a user selecting one of the UI elements may perform an action to update the patch applied to the corresponding server, to refresh the data retrieved from that server regarding the identifier of the patch applied to it, etc. In some implementations, the code to display the UI elements may populate a built-in element (e.g., "custom") of the corresponding data series (cf. the "series1" element in the visual configuration 246A shown in FIG. 2E) for each data point of that data series for which to display a UI element. Populating the element may include specifying 1) a UI element to be displayed for a given data point, and 2) a function to be called for an action to be performed via that UI element. In other implementations, the code which, when executed, will display one or more UI elements includes one or more functions that are called when an aspect of the visualization is displayed (e.g., a cell of a table). For example, a function could cause a UI element to be displayed as part of displaying the aspect of the visualization (e.g., cause a button to be displayed in the cell of the table where selecting the button performs an operation based on the value of the cell).

Figure 4D:
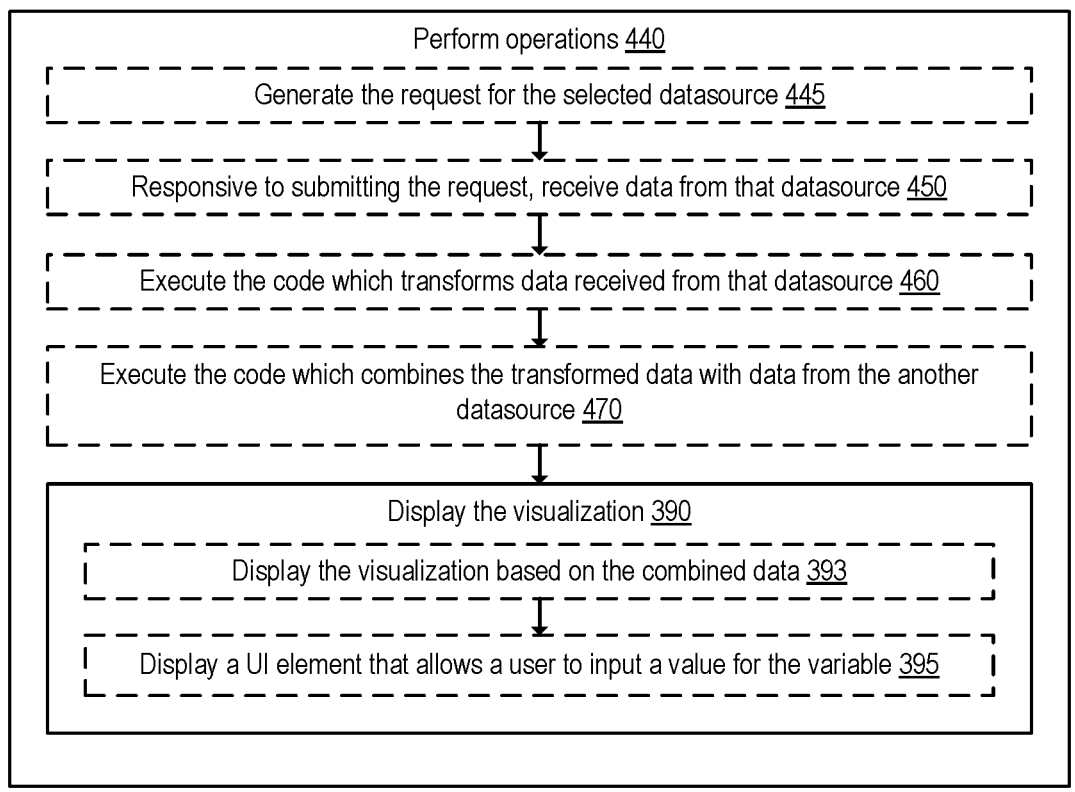
FIG. 4D is another flow diagram showing operations for processing a definition for a dashboard and displaying the dashboard, according to some example implementations.

FIG. 4D is another flow diagram showing operations for processing a definition for a dashboard and displaying the dashboard, according to some example implementations. In block 440, operations caused by a dashboard engine are performed. In block 445, the request for the selected datasource is generated. From block 445, flow passes to block 450, and data is received from that datasource responsive to submitting the request. From block 450, flow passes to block 460, and code is executed which transforms data received from that datasource. From block 460, flow passes to block 470, and code is executed which combines the transformed data with data from the another datasource. From block 470, flow passes to block 390 and the visualization is displayed as previously described. In some implementations, one or both of the selected datasource and the another datasource may be one of a plurality of selected datasources (e.g., those for which a selection is accepted in optional block 175).

The operations performed in FIG. 4D may be performed as part of creating a definition for a dashboard with user selections and manually input code. A user creating (or editing) a definition for a dashboard may wish to preview how the dashboard will look and function. Thus, the operations in FIG. 4D may be performed following operations to create a definition for a dashboard (e.g., operations described in block 157 of FIG. 1B). But in some implementations, the operations performed in FIG. 4D may be performed independently of creating or editing a definition for a dashboard.

Figure 5:
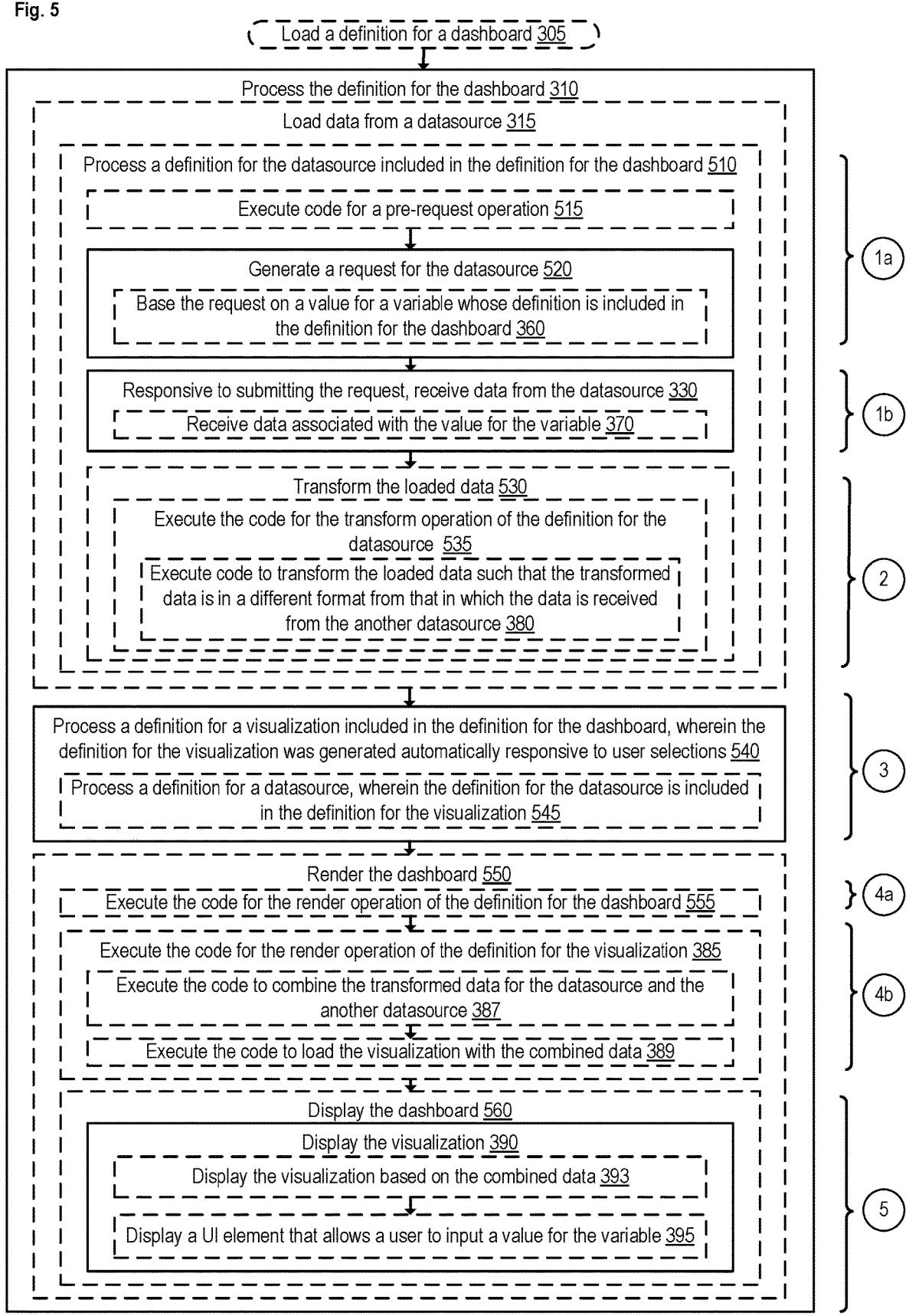
FIG. 5 is a more detailed flow diagram showing operations for processing a definition for a dashboard and displaying the dashboard, according to some example implementations.

FIG. 5 is a more detailed flow diagram showing operations for processing a definition for a dashboard and displaying the dashboard, according to some example implementations. Specifically, FIG. 5 shows a more detailed overview of the possible operations for processing a definition for a dashboard, and the potential phases for those operations. In block 305, a definition for a dashboard is loaded and in block 310, that definition is processed. The processing may include process a definition for a datasource included in the definition for the dashboard 510, processing a definition for a visualization included in the definition for the dashboard 540, and rendering the dashboard 550. As evident from the description herein, the definitions for the dashboard, datasource, and/or visualization may be automatically generated responsive to user selections and include manually input code and/or customizations.

Processing the definition for the datasource may include executing code for a pre-request operation 515. From block 515, flow passes to block 520, where a request for the datasource is generated (i.e., a request to be submitted to the datasource). Additionally or alternatively, executing the pre-request operation may generate a request for the datasource in some implementations. Per block 360, the request may be based on a value for a variable whose definition is included in the definition for the dashboard. Thus, in some implementations, processing a definition for a datasource may include processing a definition or a variable referenced in the definition for a datasource.

From block 520, flow passes to block 330. In block 330, data is received from the datasource responsive to submitting the request. Per block 370, the data received may be associated with the value for the variable (e.g., the value for the variable may filter data).

From block 330, flow passes to block 530 wherein the loaded data (i.e., that received from the datasource) is transformed. Transforming the loaded data may include executing the code for the transform operation of the definition for the datasource 535. The transform operation may perform different operations; for example, it may transform the loaded or received data such that the transformed data is in a different format from that in which the data is received from the another datasource 380. Loading data from a datasource may of course include steps which are not shown in FIG. 5. For example, receiving data from a datasource may include storing that data and making it available for a transform operation. Generating a request may be based on the "request" element of the definition for the datasource, substituting one or more values for any variables referenced in that element, and/or be based on other elements in the definition for the datasource (e.g., the type of datasource, etc.).

From block 315, flow passes to block 540 and the definition for the visualization is processed. This may include processing one or more definitions for datasources included in the definition for the visualization 545. Notably, processing such a definition may include processing one or more definitions for variables included in the definition for the visualization (e.g., definition(s) for variable(s) 142A shown in FIG. 1C). Processing a definition for a visualization may include processing a visual configuration included in the definition (not shown in FIG. 5).

From block 540, flow passes to block 550. In block 550, the dashboard is rendered. In this context, "rendering" a dashboard may include more than displaying the dashboard. For example, block 550 may include block 555, wherein code for a render operation of the definition for the dashboard is executed. As described elsewhere, this code may manipulate data. Moreover, code for a render operation of the definition for the visualization may be executed 385. The code for the render operation—whether stored at the same level of the definition for the visualization or in that definition—may combine transformed data and data received or transformed from another datasource, per block 387. In block 389, code to load the visualization with the combined data is executed. In some implementations, data may not be combined or even transformed. Thus, alternatively, the visualization may be loaded with data which is transformed or received from a datasource.

From block 385, flow passes to block 560. In block 560, the dashboard is displayed. Displaying the dashboard includes displaying the visualization 390, which may include displaying the visualization based on the combined data 393 and/or displaying a UI element that allows a user to input a value for a variable 395.

The operations described in FIG. 5 can be performed in different phases. For example, loading data from a datasource may comprise a first phase (indicated with circled numerals 1*a* and 1*b*). The first phase may be split into two phases; phase 1*a* involving operations before data is loaded from the datasource, and phase 1*b* involving loading that data. Phase 1*a* could thus be characterized as a pre-loading phase (e.g., executing the code for the pre-request operation, and generating a request for the datasource) and phase 1*b* as a loading phase. A definition for a dashboard may include multiple definitions for datasources. Thus, phase 1*a* may involve pre-loading operations for each of those datasources, and phase 1*b* submitting the requests to, and receiving data from, those datasources.

Transforming the data received from a datasource may comprise a second phase (indicated with circled numeral 2). However, transforming data may also involve transforming data received from one or more datasources whose definitions are included in a definition for a visualization (cf. circled numeral 3). Thus, circled numeral 3 may, in some implementations, include operations associated with a pre-loading phase (cf. phase 1*a*), a phase where one or more requests are submitted to one or more datasources (cf. phase 1*b*), and a transforming phase (cf. phase 2). These phases will be referred to as phases 3*a*, 3*b*, and 3*c* respectively (not shown in FIG. 5).

Rendering data may comprise a fourth phase (indicated with circled numeral 4*a* and 4*b*). The fourth phase may be split into two phases; phase 4*a* involving render operations at the level of the dashboard (e.g., including operations from executing render code such as render code 152 in FIG. 1C), and phase 4*b* involving render operations at the level of (i.e., included in) one or more definitions for visualizations (e.g., operations from executing render code such as render code 150A in FIG. 1C). In a fifth phase (indicated with circled numeral 5), the dashboard and its constituent parts (e.g., visualization(s), optional dashboard header, optional toolbar, UI elements for variables, etc.) are displayed.

Processing a dashboard may involving sequencing these phases differently in different implementations. Generally, allowing a dashboard engine to associate parts of a definition for a dashboard with different phases of processing can improve processing of the definition; e.g., the processing can be sequenced. As shown in FIG. 5, some implementations may sequence the phases in the order indicated (i.e., phase 1*a*, phase 1*b*, phase 2, phase 3, phase 4*a*, phase 4*b*, and then phase 5). Other orders for sequencing are possible. For example, phase 1*a* and phase 3*a* may occur, then phase 1*b* and phase 3*b* may occur, then phase 2 and 3*c* may occur. In other implementations, phase 4*a* may occur before phase 4*b*, or vice versa. In yet other implementations, phases 1 and 2 may occur, then phases 3*a*-*c* may be combined with phase 4*b*, etc. Different orders for sequencing may provide different benefits. For example, an order such that phase 1*b* (including retrieving data) occurs in parallel with phase 3*c* (transforming data) may improve utilization of the resources of the electronic device on which the dashboard engine is executing (e.g., if phase 1*b* is input-output intensive and phase 3*c* is processor intensive). Performing phases involving receiving data from datasources before other phases may reduce loading time for a dashboard if receiving data involves communication over a network. Moreover, performing phased sequencing facilitates data collection and profiling; for example, the time to perform a given phase, the network traffic associated with it, and other metrics (e.g., CPU utilization, disk utilization, etc.) can be collected and analyzed over time. This is turn facilitates different optimizations (e.g., optimization of a dashboard through optimizing its definition; optimizing network communication; optimizing the sequence of loading one or more dashboards, etc.). Certain orders of sequencing may assist a user in creating a dashboard. For example, load, transform, and render phases may correspond to (and include) executing pre-request code, submitting a request and transforming the data received, and executing render code. Thus, in some implementations, expressing the order in which a definition for a dashboard in the structure of the definition is an additional advantage of that structure, and thus of how the dashboard is created.

Example Electronic Devices and Environments

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store: 1) code for execution on the set of processors; and/or 2) data. "Code" means software instructions (also referred to as just software or instructions) that can be interpreted and/or executed (which are used interchangeably herein) by an electronic device or software executing on an electronic device. Examples of code include software written in a programming language (e.g., JavaScript, Python, Java, C++, etc.), formulas written in a formula language (e.g., for Matlab, Microsoft Excel, Salesforce Analytics Bindings, etc.), and software which can be directly executed by a processor (e.g., machine code) or a virtual machine (e.g., bytecode). For instance, an electronic device may include non-volatile memory (with slower read/write times, e.g., magnetic disks, optical disks, ROM, Flash memory, phase change memory, SSDs) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code may be provided directly to the set of processors (e.g., loaded into a cache of the set of processors). In other words, this non-volatile memory operates as both long-term storage and main memory, and thus the electronic device may have no or only a small amount of volatile memory for main memory. In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals such as carrier waves and/or infrared signals). For instance, typical electronic devices also include a set of one or more physical network interface(s) to establish network connections (to transmit and/or receive code and/or data using propagated signals) with other electronic devices. Thus, an electronic device may store, transmit, and/or receive (internally and/or with other electronic devices over a network) code and/or data with one or more machine-readable media (also referred to as computer-readable media).

Code or instructions can refer to source code and/or executable code. Source code means code, typically stored in human-readable form (e.g., software written in a programming or scripting language such as JavaScript, Python, Java, C++, assembly, etc.; formulas written in a formula language such as Matlab, Microsoft Excel, etc.), that is expected to be used to cause electronic devices to perform operations. This causation is typically done by: 1) converting the source code (e.g., via a compiler or assembler) into executable code (e.g., machine code, object code, bytecode, etc.) that is stored in files (e.g., object files, shared object files, dynamic link libraries, JAR files, executable files, etc.) for later execution by the same or a different electronic device; and/or 2) combining the conversion and execution (e.g., through the execution of an interpreter and/or just-in-time compiler that produce executable code that is temporarily stored and executed). Thus, source code may be executed in the sense that source code may, in cases, be converted to executable code and that executable code executed without manual intervention (e.g., by combining conversion and execution). Typically, the executable code is executed by the set of processors (either directly or via a virtual machine, bytecode interpreter, or formula engine executing on the processors) in an electronic device.

Electronic devices (also referred to as devices) are designed for and/or used for a variety of purposes, and different terms may reflect those purposes (e.g., user devices, network devices). Some user devices are designed to mainly be operated as servers (sometime referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, etc.). The software executed to operate a user device (typically a server device) as a server may be referred to as server software or server code), while the software executed to operate a user device (typically a client device) as a client may be referred to as client software or client code. A server provides one or more services to (also referred to as serves) one or more clients.

The term "user" refers to an entity (e.g., an individual person) that uses an electronic device, and software and/or services may use credentials to distinguish different accounts associated with the same and/or different users. Users can have one or more roles, such as administrator, programmer/developer, and end user roles.

Figure 6A:
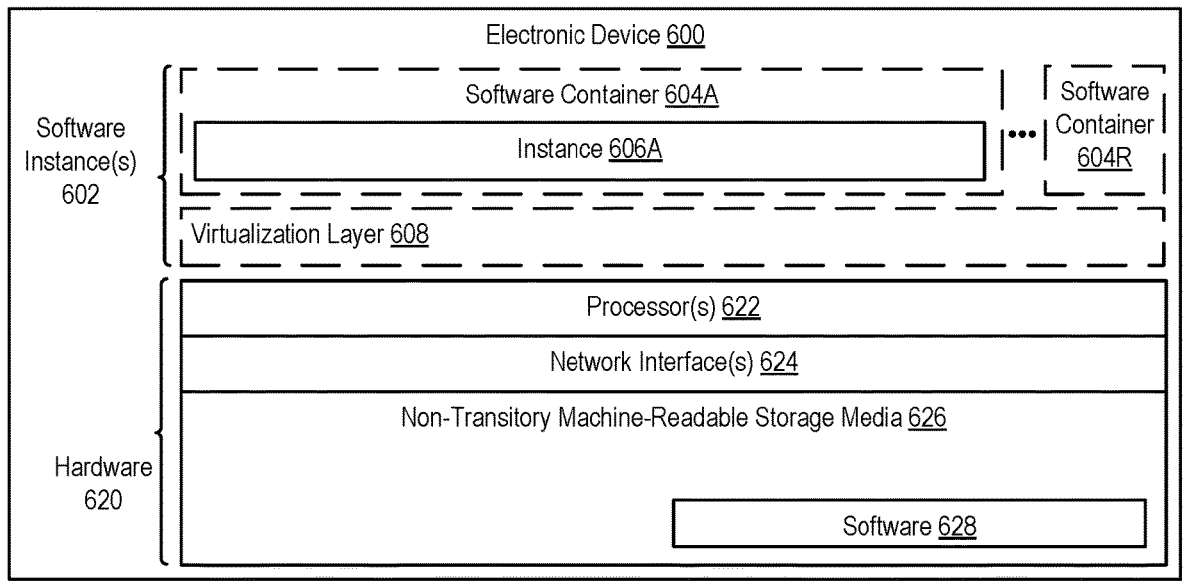
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and non-transitory machine-readable storage media 626 having stored therein software 628 (which includes instructions executable by the set of one or more processor(s) 622). Each of the previously described clients and the dashboard engine and/or editor may be implemented in one or more electronic devices 600. In one implementation: 1) each of the clients is implemented in a separate one of the electronic devices 600 (e.g., in end user devices where the software 628 represents the software to implement clients to interface directly and/or indirectly with the dashboard engine and/or editor (e.g., software 628 represents a web browser, a native client, a portal, a command-line interface, and/or an API based upon protocols such as Simple Object Access Protocol (SOAP), REST, etc.)); 2) the dashboard engine and/or editor is implemented in a separate set of one or more of the electronic devices 600 (e.g., a set of one or more server devices where the software 628 represents the software to implement the dashboard engine and/or editor); and 3) in operation, the electronic devices implementing the clients and the dashboard engine and/or editor would be communicatively coupled (e.g., by a network) and would establish between them (or through one or more other layers and/or or other services) connections for submitting data to and from the dashboard engine and/or editor. Other configurations of electronic devices may be used in other implementations (e.g., an implementation in which the client and the dashboard engine and/or editor are implemented on a single electronic device 600). In some implementations, the client and the dashboard engine may be combined or separate. For example, the dashboard engine and/or editor may be implemented in or with a web browser or native client.

During operation an instance of the software 628 (illustrated as instance 606A and also referred to as a software instance; and in the more specific case of an application, as an application instance) is executed. In electronic devices that use compute virtualization, the set of one or more processor(s) 622 typically execute software to instantiate a virtualization layer 608 and software container(s) 604A-R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 628 is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

Example Environment

Figure 6B:
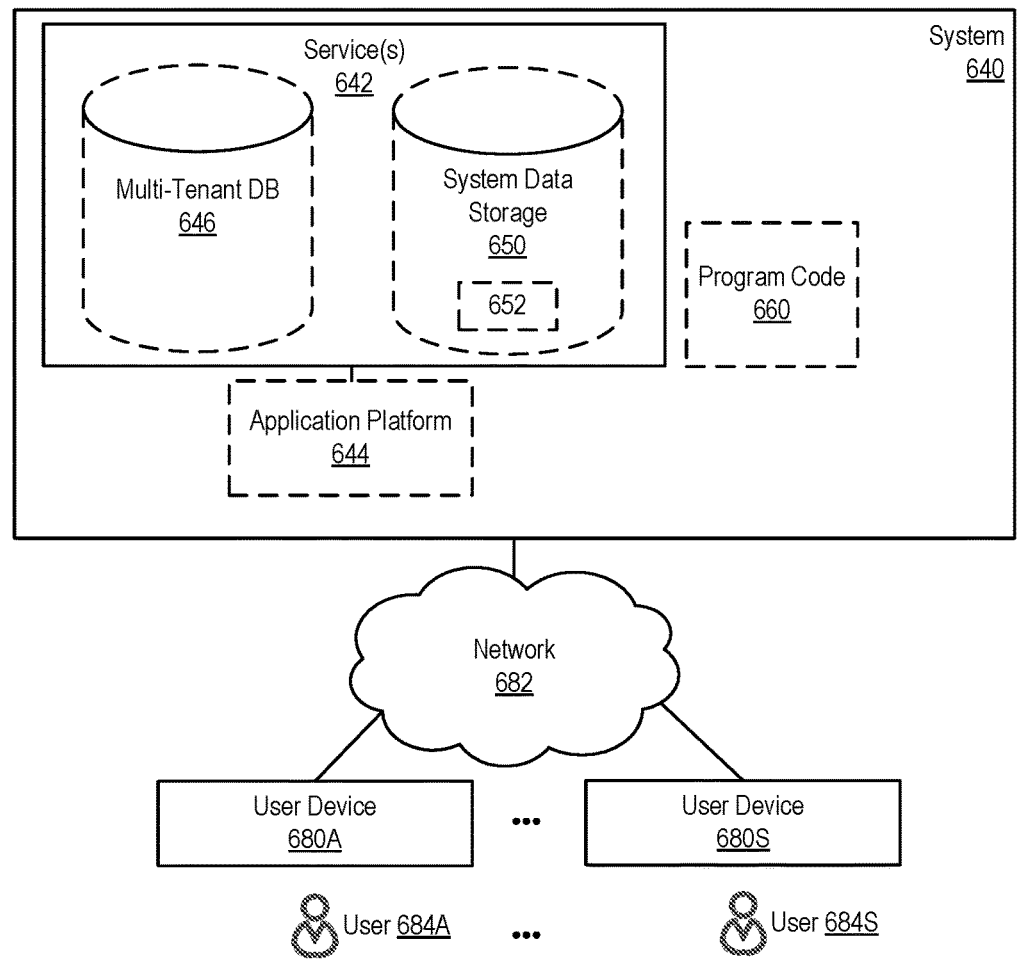
FIG. 6B is a block diagram of a deployment environment according to some example implementations.

FIG. 6B is a block diagram of a deployment environment according to some example implementations. A system 640 includes hardware (e.g., a set of one or more server devices) and software to provide service(s) 642, including the dashboard engine and/or editor. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third party datacenter(s), which are datacenter(s) owned and/or operated by one or more different entities than the entity that provides the service(s) 642 (e.g., the different entities may host some or all of the software provided and/or operated by the entity that provides the service(s) 642). For example, third party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-S over a network 682. The service(s) 642 may be on-demand services that are made available to one or more of the users 684A-S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-S). The service(s) 642 may communicate with each other and/or with one or more of the user devices 680A-S via one or more APIs (e.g., a REST API). The user devices 680A-S are operated by users 684A-S.

In some implementations the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services (one or more of which could include, interface with, or otherwise use or offer the dashboard engine and/or editor), such as one or more of the following:

In some implementations, the service(s) 642 are implemented using virtual applications dynamically created at run time responsive to queries from the user electronic devices 680A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup

| Type of Service | Example Service(s) by salesforce.com, inc. |
| --- | --- |
| Customer relationship management (CRM) | Sales Cloud |
| Configure, price, quote (CPQ) | CPQ and Billing |
| Business process modeling (BPM) | Process Builder |
| Customer support | Service Cloud, Field Service Lightning |
| Marketing | Commerce Cloud Digital, Commerce Cloud Order Management, Commerce Cloud Store |
| External data connectivity | Salesforce Connect |
| Productivity | Quip |
| Database-as-a-Service | Database.com ™ |
| Data-as-a-Service (DAAS or DaaS) | Data.com |
| Platform-as-a-service (PAAS or PaaS) | Heroku ™ Enterprise, Thunder, Force.com ®, Lightning |
| Infrastructure-as-a-Service (IAAS or IaaS) (e.g., virtual machines, servers, and/or storage) | |
| Analytics | Einstein Analytics, Sales Analytics, Service Analytics |
| Community | Community Cloud, Chatter |
| Internet-of-Things (IoT) | Salesforce IoT, IoT Cloud |
| Industry-specific | Financial Services Cloud, Health Cloud |
| Artificial intelligence (AI) | Einstein |
| Application marketplace ("app store") | AppExchange, AppExchange Store Builder |
| Data modeling | Schema Builder |
| Security | Salesforce Shield |
| Identity and access management (IAM) | Field Audit Trail, Platform Encryption, IT Governance, Access Management, Salesforce Identity, Salesforce Authenticator |

For example, system 640 may include an application platform 644 that enables PAAS for creating, managing, and executing one or more applications developed by the provider of the application platform 644, users accessing the system 640 via one or more of user electronic devices 680A-S, or third-party application developers accessing the system 640 via one or more of user electronic devices 680A-S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user electronic device 680A-S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the one or more multi-tenant database 646 and/or system data storage 650.

mechanism that supports application developers' creation and management of applications, which may be saved as metadata by save routines. Invocations to such applications, including the dashboard engine and/or editor, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user electronic devices 680A-S.

Each user electronic device 680A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a GUI provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow a user 684 to interact with various GUI pages that may be presented to a user 684. User electronic devices 680A-S might communicate with system 640 using TCP/IP (Transfer Control Protocol and Internet Protocol) and, at a higher network level, use other networking protocols to communicate, such as HTTP, File Transfer Protocol (FTP), Andrew File System (AFS), Wireless Application Protocol (WAP), Network File System (NFS), an API based upon protocols such as Simple Object Access Protocol (SOAP), REST, etc. In an example where HTTP is used, one or more user electronic devices 680A-S might include an HTTP client, commonly referred to as a "browser," for sending and receiving HTTP messages to and from server(s) of system 640, thus allowing users 684 of the user electronic device 680A-S to access, process and view information, pages and applications available to it from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," "some implementations," "other implementations," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A set of one or more non-transitory machine-readable media that provides instructions that, if executed by a processor, are capable of causing operations comprising:
    accepting from a user through a first user interface (UI) element a selection of a type of visualization;
    automatically generating a definition for a visualization of the selected type;
    accepting from the user through a second UI element a selection of a plurality of datasources, wherein a datasource from the selected plurality of datasources is a source of data for a dashboard;
    automatically generating a definition for each of the selected datasources;
    displaying in a third UI element the definitions for the visualization and the selected datasources;
    accepting from the user through the third UI element manually input customizations and code, wherein the customizations are for a request to submit to at least one of the selected datasources and a request to submit to another of the selected datasources, and wherein executing the code manually input by the user through the third UI element will transform data received from the at least one of the selected datasources responsive to submitting the request to the at least one of the selected datasources and combine the transformed data with data received from the another of the selected datasources responsive to submitting the request to the another of the selected datasources, the data received from the at least one of the selected datasources and the data received from the another of the selected datasources having different formats; and
    storing as a definition for the dashboard a resulting combination of code and definitions, which when processed by a dashboard engine executing on an electronic device, causes display of the visualization based on the combined data.

2. The set of non-transitory machine-readable media of claim 1, wherein the set of media further provides instructions that, if executed by the processor, are capable of causing operations comprising:

displaying the first, second, and third UI elements and a fourth UI element;
 accepting from the user through the fourth UI element a selection of a type of variable; and
 automatically generating a definition for a variable of the selected type, wherein the definition for the dashboard, when processed by a dashboard engine executing on an electronic device, further causes display of a UI element that allows for a value for the variable to be input.

3. The set of non-transitory machine-readable media of claim 2, wherein the request to submit to the at least one of the selected datasources is based on the value for the variable, the selected type of variable corresponds to a type of a field of records in that datasource, and the value for the variable is to filter those records.

4. The set of non-transitory machine-readable media of claim 1, wherein the code whose execution will transform data received from the at least one of the selected datasources, and whose execution will combine the transformed data with data received from the another of the selected datasources, is inputted separately by the user and is stored in a separate part of the definition for the dashboard.

5. The set of non-transitory machine-readable media of claim 4, wherein
 both the customizations for the request and the code whose execution will transform data received from the at least one of the selected datasources are associated with the definition for that datasource;
 both the definitions for the selected datasources and the code whose execution will combine the transformed data with data from another of the selected datasources are associated with the definition for the visualization; and
 the data received from the at least one of the selected datasources, the transformed data, and the combined data is available for display only by the visualization.

6. The set of non-transitory machine-readable media of claim 1, wherein
 the combined data comprises a plurality of data series displayed by the visualization,
 code manually input by the user through the third UI element, when executed, will further display one or more UI elements each associated with a corresponding one of the data series or data points displayed by the visualization, and
 each of the one or more UI elements allows an action to be performed which relates to the corresponding one of the data series or data points.

7. The set of non-transitory machine-readable media of claim 1, wherein the code whose execution will combine the transformed data with the data received from the another of the selected datasources will, when executed, further perform filtering such that the combined data includes a set of datapoints with fewer datapoints than those in the transformed data and those in the data received from the another of the selected datasources.

8. The set of non-transitory machine-readable media of claim 1, wherein the code manually input by the user through the third UI element will further, when executed, configure an appearance of the visualization based on the combined data.

9. The set of non-transitory machine-readable media of claim 1, wherein the code manually input by the user through the third UI element will further, when executed:
 generate another request to submit to the another of the selected datasources;
 transform data received from that datasource responsive to submitting the another request; and
 combine as the combined data the transformed data from each of the at least one of the selected datasources and the another of the selected datasources.

10. The set of non-transitory machine-readable media of claim 1 that also provides the dashboard engine that, if executed by another processor, is capable of causing the another processor to perform operations comprising:
 generating the request for the at least one of the selected datasources;
 responsive to submitting the request, receiving data from that datasource;
 executing the code which transforms data received from that datasource;
 executing the code which combines the transformed data with data from the another of the selected datasources; and
 displaying the visualization based on the combined data.

11. The set of non-transitory machine-readable media of claim 1, wherein the accepting the selection of the plurality of datasources and the automatically generating a definition for each of the datasources occurs iteratively.

12. A non-transitory machine-readable medium that provides for a dashboard a definition that causes a dashboard engine, when executed on an electronic device, to perform operations comprising:
 processing the definition for the dashboard, wherein the definition for the dashboard includes definitions for first and second datasources and a definition for a visualization, wherein a datasource from the first and second datasources is a source of data for a dashboard, wherein the definitions for first and second datasources each include code for a transform operation, wherein the definition for the visualization was generated automatically responsive to user selections and includes code for a render operation, and wherein the code for the transform and render operations was written manually by a user, the processing comprising:
  loading data from each of the first and second datasources, the loading including:
   generating a request for that datasource;
   responsive to submitting the request, receiving data from that datasource; and
   executing the code for the transform operation of the definition for that datasource;
  executing the code for the render operation of the definition for the visualization to combine the transformed data for the first and second datasources and to load the visualization with the combined data, wherein the data received from the first datasource and the data received from the second datasource have different formats prior to being transformed; and
  displaying the visualization based on the combined data.

13. The non-transitory machine-readable medium of claim 12, wherein the definition for the dashboard includes a definition for a variable, wherein the request is based on a value for the variable which is to filter records in at least one of the first and second datasources.

14. The non-transitory machine-readable medium of claim 13, wherein the value for the variable on which the request is based is a default value.

15. The non-transitory machine-readable medium of claim 13, wherein the definition for the dashboard includes another variable, the displaying further includes displaying another UI element that allows the user to input a value for the another variable, and the request for one of the first and second datasources is based on a value for the another variable.

16. The non-transitory machine-readable medium of claim 13, wherein the dashboard is addressable via a uniform resource locator (URL) and the value for the variable is added as a parameter of the URL.

17. The non-transitory machine-readable medium of claim 12, wherein the executing the code for the transform operation of one of the definitions for the first and second datasources causes the transformed data to be in a different format from that in which the data is received from the corresponding datasource.

18. The non-transitory machine-readable medium of claim 12, wherein the respective code for the transform operation of the definition for the first and second datasources is different.

19. The non-transitory machine-readable medium of claim 12, wherein
the definitions for the first and second datasources are associated with the definition for the visualization; and
the data received from those datasources, the transformed data, and the combined data is available for display only by the visualization.

20. The non-transitory machine-readable medium of claim 12, wherein
the combined data comprises a plurality of data series displayed by the visualization,
executing the code for the render operation further causes display of one or more UI elements each associated with a corresponding one of the data series displayed by the visualization, and
each of the one or more UI elements allows an action to be performed on data in the corresponding one of the data series.

21. The non-transitory machine-readable medium of claim 12, wherein executing the code for the render operation further performs filtering such that the combined data includes a set of datapoints with fewer datapoints than those in the transformed data of at least one of the first and second datasources.

22. The non-transitory machine-readable medium of claim 12, wherein executing the code for the render operation causes an appearance of the visualization to be configured based on the combined data.

23. The non-transitory machine-readable medium of claim 12, wherein the definition for the dashboard further includes code written manually by a user for a pre-request operation, wherein the code is associated with the definition for one of the first and second datasources, wherein the processing the definition for the dashboard further comprises executing the code for the pre-request operation before submitting the request to the one of the first and second datasources, and wherein the executing the code for the pre-request operation performs the generating the request for the one of the first and second datasources.

* * * * *